US012575547B2

(12) United States Patent
Erickson et al.

(10) Patent No.: US 12,575,547 B2
(45) Date of Patent: Mar. 17, 2026

(54) POULTRY TOE AND CLAW POSITIONING SYSTEM AND METHOD

(71) Applicant: NOVA-TECH ENGINEERING, LLC, Willmar, MN (US)

(72) Inventors: Matthew H. Erickson, Spicer, MN (US); Austin Mueller, Atwater, MN (US); JadiMarie Hopp, Hector, MN (US); Derek Worcester, Willmar, MN (US); Christopher J. Strand, Willmar, MN (US); Dominic Oerter, Sunburg, MN (US); Scott Schueler, Willmar, MN (US)

(73) Assignee: Nova-Tech Engineering, LLC, Willmar, MN (US)

( * ) Notice: Subject to any disclaimer, the term of this patent is extended or adjusted under 35 U.S.C. 154(b) by 0 days.

(21) Appl. No.: 18/701,397

(22) PCT Filed: Apr. 27, 2022

(86) PCT No.: PCT/US2022/026467
§ 371 (c)(1),
(2) Date: Apr. 15, 2024

(87) PCT Pub. No.: WO2023/075840
PCT Pub. Date: May 4, 2023

(65) Prior Publication Data
US 2025/0008932 A1 Jan. 9, 2025

Related U.S. Application Data

(60) Provisional application No. 63/273,414, filed on Oct. 29, 2021.

(51) Int. Cl.
*A01K 45/00* (2006.01)

(52) U.S. Cl.
CPC .................................... *A01K 45/00* (2013.01)

(58) Field of Classification Search
CPC ...... A01K 45/00; A01K 45/004; A01K 37/00; A01K 1/0613; A22C 21/0007;
(Continued)

(56) References Cited

U.S. PATENT DOCUMENTS

| | | | | | |
|---|---|---|---|---|---|
| 1,450,247 A | * | 4/1923 | Carpenter | .............. | A01K 45/00 119/713 |
| 1,762,687 A | * | 6/1930 | Hodges | .................. | A01K 45/00 119/345 |

(Continued)

FOREIGN PATENT DOCUMENTS

| | | |
|---|---|---|
| CN | 214 431 463 | 10/2021 |
| FR | 2 848 410 | 6/2004 |

(Continued)

OTHER PUBLICATIONS

PCT International Search Report and Written Opinion for PCT/US2022/026467 dated Sep. 27, 2022 (18 pages).
(Continued)

*Primary Examiner* — Joshua J Michener
*Assistant Examiner* — Nicole Paige MacCrate
(74) *Attorney, Agent, or Firm* — Mueting Raasch Group

(57) ABSTRACT

Poultry toe and claw positioning systems and methods are described herein. The positioning systems and methods may be used to separate and precisely locate the forward-facing toes and claws of birds.

17 Claims, 29 Drawing Sheets

(58) Field of Classification Search

CPC ................ A22C 21/0046; A61D 1/005; A61D 2003/006; A61D 3/00; A22B 7/002

USPC .................................. 119/719, 751, 752, 853

See application file for complete search history.

(56) References Cited

U.S. PATENT DOCUMENTS

| | | | |
|---|---|---|---|
| 2,107,484 | A | 2/1938 | Lesher |
| 3,755,854 | A | 9/1973 | Van Mil |
| 3,880,122 | A * | 4/1975 | Randolph .............. A61D 1/025 |
| | | | 452/53 |
| 3,882,570 | A | 5/1975 | Zwiep et al. |
| 3,925,847 | A | 12/1975 | Leander et al. |
| 4,343,309 | A | 8/1982 | DeBose |
| 4,343,310 | A | 8/1982 | DeBose |
| 4,354,297 | A | 10/1982 | Wilson et al. |
| 4,457,048 | A | 7/1984 | Dreves |
| 4,709,448 | A | 12/1987 | McGuire et al. |
| 5,134,971 | A * | 8/1992 | Krienke ................. A01K 45/00 |
| | | | 119/713 |
| 5,195,925 | A | 3/1993 | Gorans |
| 5,248,277 | A | 9/1993 | Bos et al. |
| 5,282,441 | A * | 2/1994 | Ricketts ............... A01K 1/0613 |
| | | | 119/751 |
| 5,651,731 | A | 7/1997 | Gorans et al. |
| 5,915,334 | A * | 6/1999 | Cummings .............. A61D 3/00 |
| | | | 119/757 |
| 6,461,232 | B1 | 10/2002 | Gwyther |
| 7,066,112 | B2 | 6/2006 | Gorans |
| 7,232,450 | B2 | 6/2007 | Gorans et al. |
| 7,363,881 | B2 | 4/2008 | Gorans et al. |
| 9,775,695 | B2 | 10/2017 | Erickson |
| 9,901,432 | B2 | 2/2018 | Erickson |
| 10,624,310 | B1 * | 4/2020 | Daniels ................... A61D 3/00 |
| 2002/0102934 | A1 | 8/2002 | Gwyther |
| 2005/0101937 | A1 | 5/2005 | Gorans et al. |
| 2011/0313409 | A1 | 12/2011 | Erickson et al. |
| 2012/0012070 | A1 | 1/2012 | Gorans et al. |
| 2015/0208677 | A1 * | 7/2015 | Ostergaard ......... A22C 21/0046 |
| | | | 452/188 |
| 2019/0076228 | A1 * | 3/2019 | Kober .................. A61B 6/0428 |
| 2019/0239482 | A1 * | 8/2019 | Peacock Gallagher .. A61D 7/00 |

FOREIGN PATENT DOCUMENTS

| | | |
|---|---|---|
| WO | WO 2010/085718 | 7/2010 |
| WO | WO 2019/236964 | 12/2019 |
| WO | WO 2021/150842 | 7/2021 |

OTHER PUBLICATIONS

Preliminary Report on Patentability for PCT/US2022/026467 dated May 10, 2024 (11 pages).

International Search Report and Written Opinion issued in the PCT on Jul. 23, 2010 for PCT/US2010/021901; 11 pgs.

International Preliminary Report on Patentability issued in the PCT on Jul. 26, 2011 for PCT/US2010/021901; 7 pgs.

* cited by examiner

POULTRY TOE AND CLAW POSITIONING SYSTEM AND METHOD

RELATED APPLICATION

The application is a § 371 U.S. National Stage of International Application No. PCT/US2022/026467 filed 27 Apr. 2022, which claims the benefit under 35 U.S.C. § 119 of U.S. Provisional Application Ser. No. 63/273,414, filed 29 Oct. 2021, and titled POULTRY TOE AND CLAW POSITIONING SYSTEM AND METHOD, both of which are incorporated herein by reference in their entireties.

FIELD

Poultry toe and claw positioning systems and methods are described herein.

BACKGROUND

Precise positioning of poultry toes and claws is difficult due to the size and activity levels of birds. In some instances, birds are handled manually, i.e., individuals must physically hold the bird to position its toes and claws in selected locations and/or orientations. Manual handling of birds to position their toes and claws is, in addition to being difficult, also potentially dangerous to the bird.

Although carriers and other restraints designed to hold birds are known, the focus has largely been on precise positioning of beaks and bills. U.S. Pat. No. 5,651,731 (Gorans et al.) describes devices designed to restrain the heads of birds with the remainder of the bird being either manually restrained or unrestrained.

U.S. Pat. No. 9,808,328 (Gorans et al.) describes carriers designed to restrain the heads and torsos of birds, as well as their legs above the hock joint. U.S. Pat. No. 9,901,432 (Erickson et al.) discloses a system and method for processing the rear claw (sometimes referred to as the hind claw or anatomically identified as "phalange I") of birds restrained in, e.g., the carriers of U.S. Pat. No. 9,808,328.

SUMMARY

Poultry toe and claw positioning systems and methods are described herein. In one or more embodiments, the positioning systems and methods may be used to separate and precisely locate the toes and claws of birds.

The poultry toe and claw positioning systems and methods may allow for precise positioning of the forward-facing poultry toes and claws where the forward-facing poultry toes are those anatomical digits found at the distal/inferior end of the shank (where the shank contains the metatarsus and extends from the hock joint (sometimes referred to as the ankle joint) to the joints between the distal phalanges (sometimes referred to as the toes)). The forward-facing toes of poultry such as, e.g., ducks, chickens, geese, and turkeys, are commonly referred to anatomically as "phalanges II, III, and IV." The distal phalanges are distinguished from a proximal phalange located on the shank above/superior from the distal phalanges II, III, and IV which is commonly referred to anatomically as "phalange I" and generally faces in the rearward (dorsal) direction.

In one or more embodiments, the poultry toe and claw positioning systems and methods may allow for simultaneous positioning of the forward-facing poultry toes and claws on both shanks of a bird to, for example, expedite any inspections, etc. that would be required in systems and methods that position fewer than all of the toes and claws simultaneously.

In a first aspect, one or more embodiments of a poultry toe and claw positioning system as described herein includes: a seat lift operably attached to a system frame, the seat lift configured to move between a ready position and a lift position; and a toe guide operably attached to the system frame. The toe guide comprises: a capture plate comprising a leading edge facing away from the seat lift, a set of capture channels formed in a support surface of the capture plate, wherein each capture channel of the set of capture channels is configured to receive a forward-facing toe of a bird and the set of capture channels is configured to receive the forward-facing toes on one shank of a bird, wherein each capture channel of the set of capture channels comprises an open end proximate the leading edge of the capture plate, and wherein the set of capture channels converge when moving away from the open ends of the capture channels along the support surface, and a guide opening in the set of capture channels, wherein the set of capture channels converge at the guide opening; a set of guide channels extending from the guide opening through the capture plate, wherein each guide channel of the set of guide channels extends through the support plate from a receiving aperture in the guide opening to a claw aperture located distal from the receiving aperture, wherein the set of guide channels diverge when moving from the receiving apertures of the guide channels to the claw apertures of the guide channels. The system further includes an optional toe guide track operably attached to the system frame, the toe guide track defining a guide axis, wherein the toe guide is mounted on the toe guide track and configured to move along the guide axis between a home position, a capture position, and a finish position, wherein the home position is closer to the lift axis than the capture position, and wherein the finish position is located between the capture position and the home position; a toe guide actuator operably connected to the toe guide, the toe guide actuator configured to move the toe guide along the guide axis between the home position, the capture position, and the finish position; a seat lift actuator operably connected to the seat lift, the seat lift actuator configured to rotate the seat lift about the lift axis to move the seat lift between the ready position and the lift position; and a controller operably connected to the toe guide actuator and the seat lift actuator. The controller is configured to: operate the seat lift actuator such that the seat lift actuator moves the seat lift from the ready position to the lift position, operate the toe guide actuator such that the toe guide actuator moves the toe guide along the guide axis from the home position to the capture position after operating the seat lift actuator to rotate the seat lift from the ready position to the lift position, and operate the toe guide actuator such that the toe guide actuator moves the toe guide along the guide axis from the capture position to the finish position after moving the toe guide along the guide axis from the home position to the capture position.

In one or more embodiments of a poultry toe and claw positioning system according to the first aspect as described herein, the capture channels of the set of capture channels are oriented generally parallel/aligned with each other when moving along the guide axis away from the guide opening.

In one or more embodiments of a poultry toe and claw positioning system according to the first aspect as described herein, the toe guide track is configured to move from a base position to an operating position, wherein the system further comprises a track actuator operably connected to the toe guide track to move the toe guide track between the base position and the operating position, wherein the track actuator is operably connected to the controller; wherein the controller is configured to operate the track actuator such that the track actuator moves the toe guide track from the base position to the operating position after operating the toe guide actuator to move the toe guide along the guide axis away from the home position and before the toe guide reaches the capture position; and wherein, optionally, the toe guide track rotates about a track axis when moving between the base position and the operating position. In one or more embodiments, the controller is configured to operate the track actuator such that the track actuator moves the toe guide track from the base position to the operating position before operating the toe guide actuator to move the toe guide along the guide axis from the capture position to the finish position.

In one or more embodiments of a poultry toe and claw positioning system according to the first aspect as described herein, the system comprises a seat lift support, wherein the seat lift is located on the seat lift support, wherein the seat lift support is configured to move the seat lift from a retracted position to a forward position, and wherein the seat lift from the ready position to the lift position as the seat lift support moves from the retracted position to the forward position.

In one or more embodiments of a poultry toe and claw positioning system according to the first aspect including a seat lift as described herein, the seat lift actuator is operably connected to the seat lift support, the seat lift actuator configured to move the seat lift support between the retracted position and the forward position while the seat lift actuator rotates the seat lift about the lift axis from the ready position to the lift position. In one or more embodiments, movement of the seat lift support between the retracted position and the forward position moves the lift axis.

In one or more embodiments of a poultry toe and claw positioning system according to the first aspect including a seat lift and seat lift support as described herein, the seat lift support is configured to rotate about a support axis when moving between the retracted position and the forward position, and wherein, optionally, movement of the seat lift support between the retracted position and the forward position rotates the lift axis about the support axis.

In one or more embodiments of a poultry toe and claw positioning system according to the first aspect as described herein, the guide opening extends through the capture plate between adjacent pairs of the guide channels of the set of guide channels such that the guide opening and the set of guide channels are configured to receive webbing extending between adjacent pairs of forward-facing toes in the adjacent pairs of guide channels.

In one or more embodiments of a poultry toe and claw positioning system according to the first aspect as described herein, the track axis is offset from and transverse to the lift axis.

In one or more embodiments of a poultry toe and claw positioning system according to the first aspect as described herein, the system comprises a poultry cradle located in a selected position relative to the system frame, wherein the poultry cradle is configured to restrain a bird such that the seat lift acts on a seat of the bird when the poultry cradle is in the selected position and the seat lift is in the lift position, the poultry cradle optionally comprising: a torso support shaped to support and atraumatically retain the torso of the bird restrained in the poultry cradle; a head support operably attached to the torso support and positioned to receive a head of the bird restrained in the poultry cradle with its chest supported against the torso support; a head clamp operably attached to the head support, wherein the head clamp and the head support cooperate to receive and atraumatically retain a head of the bird between the head clamp and the head support; a shank clamp operably attached to the torso support, the shank clamp positioned to receive and atraumatically retain a shank of the bird restrained in the poultry cradle, wherein the shank clamp comprises an open configuration in which the shank can be positioned in the shank clamp and a closed configuration in which the shank is retained in the shank clamp. In one or more embodiments, an optional shank guide is positioned between the shank clamp and the torso support, the shank guide restraining the shank of the bird restrained in the poultry cradle from movement in the lateral and medial directions when the shank clamp is in the open configuration and the closed configuration. In one or more embodiments, a position of the shank guide relative to the torso support and the shank clamp is fixed. In one or more embodiments, a distance between an inferior/distal/bottom side the shank clamp and an inferior/distal/bottom side of the shank guide along a longitudinal (superior/inferior) axis extending through the head support and the torso support is 5 millimeters or more, 1 centimeter or more, or 2 centimeters or more. In one or more embodiments, the distance between an inferior/distal/bottom side the shank clamp and an inferior/distal/bottom side of the shank guide along a longitudinal (superior/inferior) axis extending through the head support and the torso support is 3 centimeters or less, 2 centimeters or less, or 1 centimeter or less.

In a second aspect, one or more embodiments of a poultry toe and claw positioning system as described herein includes: a seat lift operably attached to a system frame, the seat lift configured to move between a ready position and a lift position; a toe guide operably attached to the system frame. The toe guide comprises: a capture plate comprising a leading edge facing away from the seat lift, a set of capture channels formed in a support surface of the capture plate, wherein each capture channel of the set of capture channels is configured to receive a forward-facing toe of a bird and the set of capture channels is configured to receive the forward-facing toes on one shank of a bird, wherein each capture channel of the set of capture channels comprises an open end proximate the leading edge of the capture plate, and wherein the set of capture channels converge when moving away from the open ends of the capture channels along the support surface, and a guide opening in the set of capture channels, wherein the set of capture channels converge at the guide opening; a set of guide channels extending from the guide opening through the capture plate, wherein each guide channel of the set of guide channels extends through the support plate from a receiving aperture in the guide opening to a claw aperture located distal from the receiving aperture, wherein the set of guide channels diverge when moving from the receiving apertures of the guide channels to the claw apertures of the guide channels. The system further comprises a toe guide track operably attached to the system frame, the toe guide track defining a guide axis, wherein the toe guide is mounted on the toe guide track and configured to move along the guide axis between a home position, a capture position, and a finish position, wherein the home position is closer to the lift axis than the capture position, and wherein the finish position is located between the capture position and the home position, and further wherein the toe guide track is configured to move from a base position to an operating position; a toe guide actuator operably connected to the toe guide, the toe guide actuator configured to move the toe guide along the guide axis between the home position, the capture position, and the finish position; a seat lift actuator operably connected to the seat lift, the seat lift actuator configured to rotate the seat lift about the lift axis to move the seat lift between the ready position and the lift position; a track actuator operably connected to the toe guide track to move the toe guide track between the base position and the operating position, wherein, optionally, the toe guide track rotates about a track axis when moving between the base position and the operating position; and a controller operably connected to the toe guide actuator, the seat lift actuator, and the track actuator. The controller is configured to: operate the seat lift actuator such that the seat lift actuator moves the seat lift from the ready position to the lift position, operate the toe guide actuator such that the toe guide actuator moves the toe guide along the guide axis from the home position to the capture position after operating the seat lift actuator to rotate the seat lift from the ready position to the lift position, and operate the toe guide actuator such that the toe guide actuator moves the toe guide along the guide axis from the capture position to the finish position after moving the toe guide along the guide axis from the home position to the capture position, and operate the track actuator such that the track actuator moves the toe guide track from the base position to the operating position after operating the toe guide actuator to move the toe guide along the guide axis away from the home position and before the toe guide reaches the capture position.

In one or more embodiments of a poultry toe and claw positioning system according to the second aspect as described herein, the capture channels of the set of capture channels are oriented generally parallel/aligned with each other when moving along the guide axis away from the guide opening.

In one or more embodiments of a poultry toe and claw positioning system according to the second aspect as described herein, the system further comprises a seat lift support, wherein the seat lift is located on the seat lift support, wherein the seat lift support is configured to move the seat lift from a retracted position to a forward position, and wherein the seat lift from the ready position to the lift position as the seat lift support moves from the retracted position to the forward position. In one or more embodiments, the seat lift actuator is operably connected to the seat lift support, the seat lift actuator configured to move the seat lift support between the retracted position and the forward position while the seat lift actuator rotates the seat lift about the lift axis from the ready position to the lift position. In one or more embodiments, movement of the seat lift support between the retracted position and the forward position moves the lift axis. In one or more embodiments, the seat lift support is configured to rotate about a support axis when moving between the retracted position and the forward position, and wherein, optionally, movement of the seat lift support between the retracted position and the forward position rotates the lift axis about the support axis.

In one or more embodiments of a poultry toe and claw positioning system according to the second aspect as described herein, the guide opening extends through the capture plate between adjacent pairs of the guide channels of the set of guide channels such that the guide opening and the set of guide channels are configured to receive webbing extending between adjacent pairs of forward-facing toes in the adjacent pairs of guide channels.

In one or more embodiments of a poultry toe and claw positioning system according to the second aspect as described herein, the track axis is offset from and transverse to the lift axis.

In one or more embodiments of a poultry toe and claw positioning system according to the second aspect as described herein, the system comprises a poultry cradle located in a selected position relative to the system frame, wherein the poultry cradle is configured to restrain a bird such that the seat lift acts on a seat of the bird when the poultry cradle is in the selected position and the seat lift is in the lift position. In one or more embodiments, the poultry cradle comprises: a torso support shaped to support and atraumatically retain the torso of the bird restrained in the poultry cradle; a head support operably attached to the torso support and positioned to receive a head of the bird restrained in the poultry cradle with its chest supported against the torso support; a head clamp operably attached to the head support, wherein the head clamp and the head support cooperate to receive and atraumatically retain a head of the bird between the head clamp and the head support; a shank clamp operably attached to the torso support, the shank clamp positioned to receive and atraumatically retain a shank of the bird restrained in the poultry cradle, wherein the shank clamp comprises an open configuration in which the shank can be positioned in the shank clamp and a closed configuration in which the shank is retained in the shank clamp. In one or more embodiments, the poultry cradle includes a shank guide positioned between the shank clamp and the torso support, the shank guide restraining the shank of the bird restrained in the poultry cradle from movement in the lateral and medial directions when the shank clamp is in the open configuration and the closed configuration. In one or more embodiments, a position of the shank guide relative to the torso support and the shank clamp is fixed. In one or more embodiments, a distance between an inferior/distal/bottom side the shank clamp and an inferior/distal/bottom side of the shank guide along a longitudinal (superior/inferior) axis extending through the head support and the torso support is 5 millimeters or more, 1 centimeter or more, or 2 centimeters or more. In one or more embodiments, the distance between an inferior/distal/bottom side the shank clamp and an inferior/distal/bottom side of the shank guide along a longitudinal (superior/inferior) axis extending through the head support and the torso support is 3 centimeters or less, 2 centimeters or less, or 1 centimeter or less.

In a third aspect, one or more embodiments of a method of positioning the toes and claws of a bird as described herein includes: positioning a bird in a poultry cradle in a selected position relative to a system frame, wherein a left shank of the bird is located in a left shank clamp of the poultry cradle; positioning the left forward-facing toes of the bird in a set of left-side capture channels on a support surface of a capture plate of a toe guide positioning the bird in the poultry cradle in the selected position, wherein each left forward-facing toe is located in a separate left-side capture channel of the set of left-side capture channels, and wherein positioning the left forward-facing toes in the plurality of left-side capture channels comprises moving the toe guide in a capture direction such that left forward-facing toes enter the plurality of left-side capture channels at open ends of the plurality of left-side capture channels, wherein the set of left-side capture channels converge when moving along the support surface away from the open ends of the set of left-side capture channels such that the left forward-facing toes of the bird converge in the set of left-side capture channels as the toe guide moves in the capture direction; positioning the left forward-facing toes of the bird in a set of left-side guide channels formed through the capture plate by moving the capture plate of the toe guide in a finish direction that is opposite the capture direction after the left forward-facing toes of the bird converge in the plurality of left-side capture channels, wherein each left-side guide channel of the set of guide channels extends through the support plate from guide opening in the set of capture channels, wherein each guide channel of the set of guide channels extends through the support plate from a receiving aperture in the guide opening to a claw aperture located distal from the receiving aperture, wherein the set of guide channels diverge when moving from the receiving apertures of the guide channels to the claw apertures of the guide channels such that the left forward-facing toes of the bird diverge in the set of left-side guide channels as the toe guide moves in the finish direction; and holding the left forward-facing toes of the bird in the set of left-side guide channels after claws at the distal/inferior ends of the left forward-facing toes extend out of the claw apertures of the set of left-side guide channels.

In one or more embodiments of a method of positioning the toes and claws of a bird as described herein, the method comprises moving a seat of the bird away from the left shank clamp; and wherein positioning the left forward-facing toes of the bird in the set of left-side capture channels comprises positioning the left forward-facing toes of the bird in the set of left-side capture channels after moving the seat of the bird away from the left shank clamp. In one or more embodiments, moving the seat of the bird away from the left shank clamp moves a distal end of the shank of the bird towards the left shank clamp. In one or more embodiments, moving the seat of the bird away from the left shank clamp comprises moving the seat of the bird away from the left shank clamp by moving a seat lift from a ready position to a lift position, and wherein, optionally, moving the seat lift from the ready position to the lift position comprises rotating the seat lift about a lift axis. In one or more embodiments, the seat lift is mounted on a seat lift support, wherein the method comprises moving the seat lift support from a retracted position to a forward position, wherein the seat lift is closer to the poultry cradle when the seat lift support is in the forward position than the retracted position. In one or more embodiments, the method comprises moving the seat lift support from the retracted position to a forward position while moving the seat lift from the ready position to the lift position. In one or more embodiments, moving the seat lift support between the retracted position and the forward position moves the lift axis.

In one or more embodiments of a method of positioning the toes and claws of a bird as described herein, the toe guide is mounted on a toe guide track, and wherein the method comprises moving the toe guide track from a base position to an operating position after positioning the left forward-facing toes of the bird in the plurality of left-side capture channels, wherein the toe guide is closer to the poultry cradle when the toe guide track is in the operating position than the base position. In one or more embodiments, the method comprises moving the toe guide track from the base position to the operating position before positioning the left forward-facing toes of the bird in the plurality of left-side guide channels.

In one or more embodiments of a method of positioning the toes and claws of a bird as described herein, the capture channels of the set of capture channels are oriented generally parallel/aligned with each other when moving along the guide axis away from the guide opening.

As used herein with respect to the restraint of live birds, the term "atraumatic restraint" (and variations thereof) means restraint that does not require puncturing the skin of the bird to restrain the bird.

As used herein, the term "aligned with" as used in connection with various components, axes, directions of travel, etc. includes both parallel and generally parallel arrangements. For example, two axes may be described as "aligned with" when the axes are both perfectly parallel with each other or nearly parallel, e.g., the axes may form an angle with each other that is greater than 0° but 10° or less.

Numeric values used herein include normal variations in measurements as expected by persons skilled in the art and should be understood to have the same meaning as "approximately" and to cover a typical margin of error, such as ±5% of the stated value.

Terms such as "a," "an," and "the" are not intended to refer to only a singular entity but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure, including the claims.

BRIEF DESCRIPTION OF THE DRAWING

The views of the drawing depict various features of only some illustrative embodiments of the present invention, with like reference numerals indicating like features in the figures.

Figure 1:
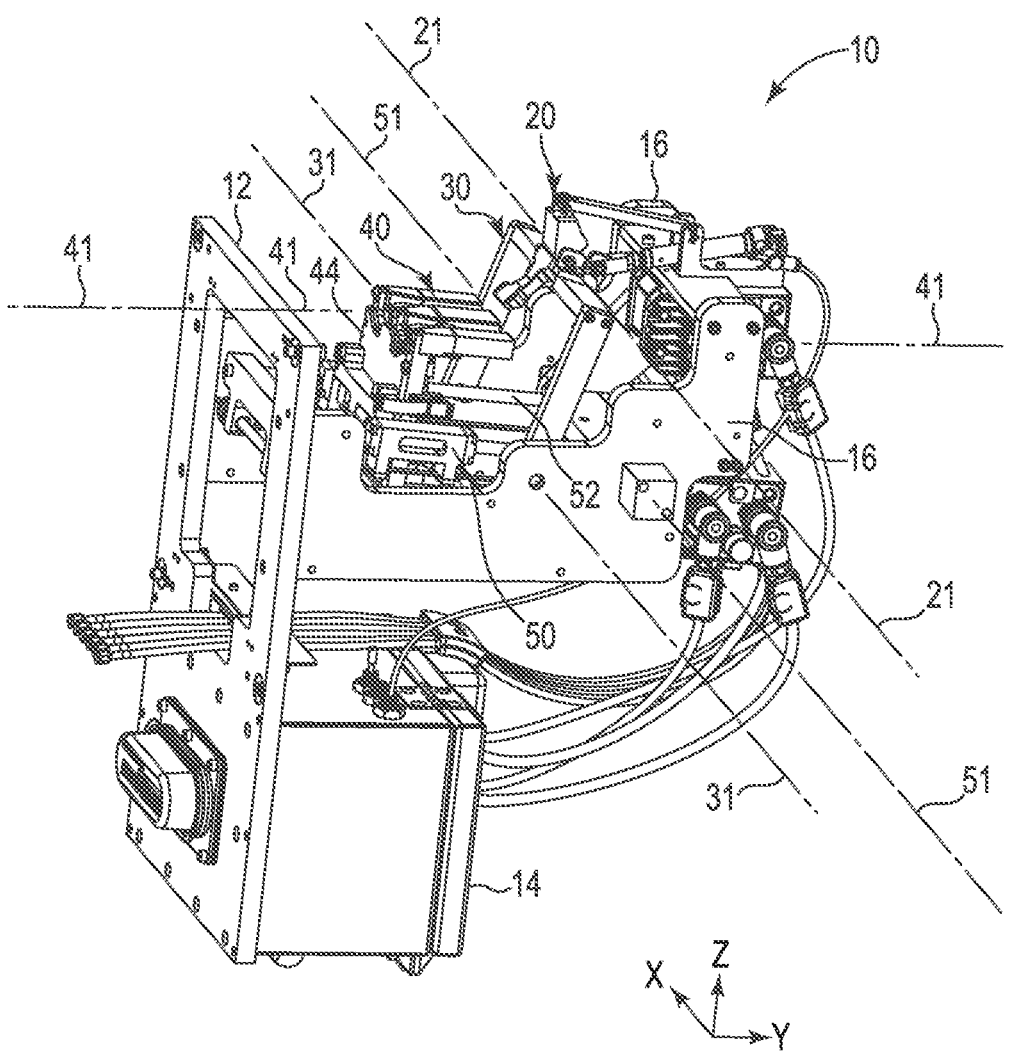
FIG. 1 is a top perspective view of one illustrative embodiment of a poultry toe and claw positioning system as described herein.

While the above-identified figures (which may or may not be drawn to scale) set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope of this invention.

DESCRIPTION OF ILLUSTRATIVE
EMBODIMENTS

Before any illustrative embodiments are described in detail, it is to be understood that the invention is not limited in its application to the details of construction and the arrangement of components set forth in the following description or illustrated in the figures of the drawing. The invention is capable of other embodiments and of being practiced or of being carried out in various ways.

Figure 2:
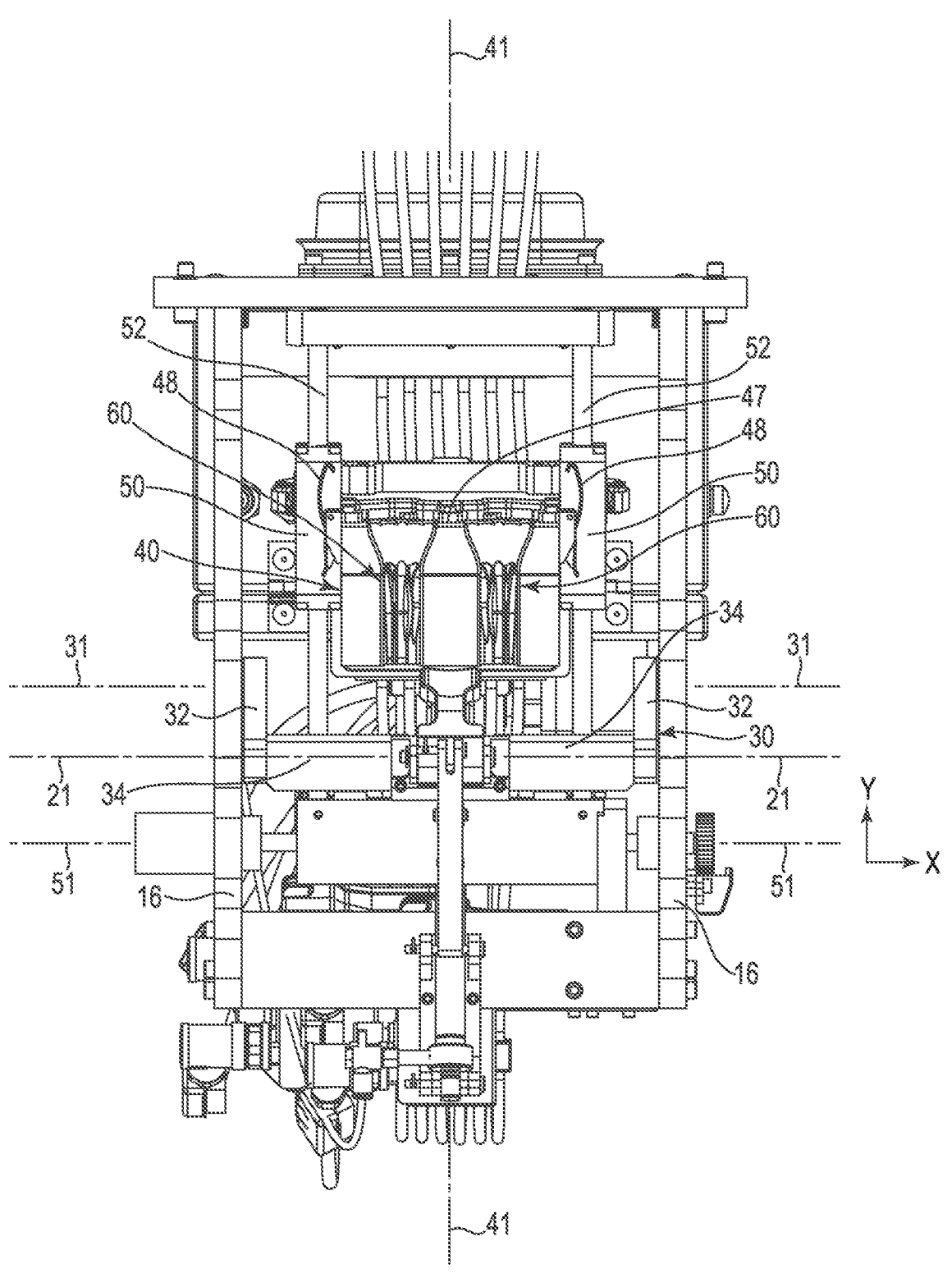
FIG. 2 is a top view of the poultry toe and claw positioning system of FIG. 1.
Figure 3:
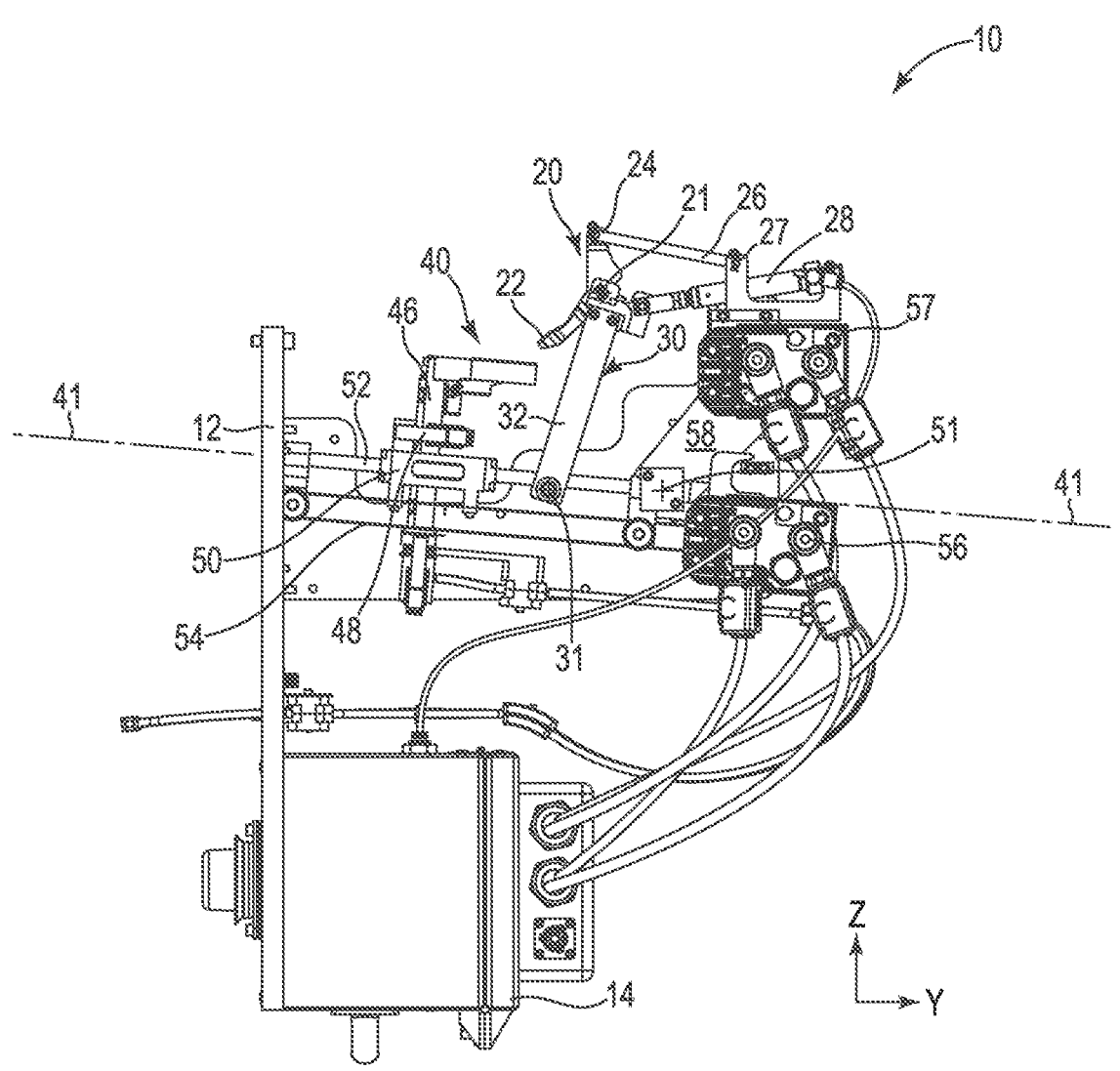
FIG. 3 is a left side view of the poultry toe and claw positioning system of FIGS. 1 and 2 with the left side plate removed to expose components of the poultry toe and claw positioning system.
Figure 4:
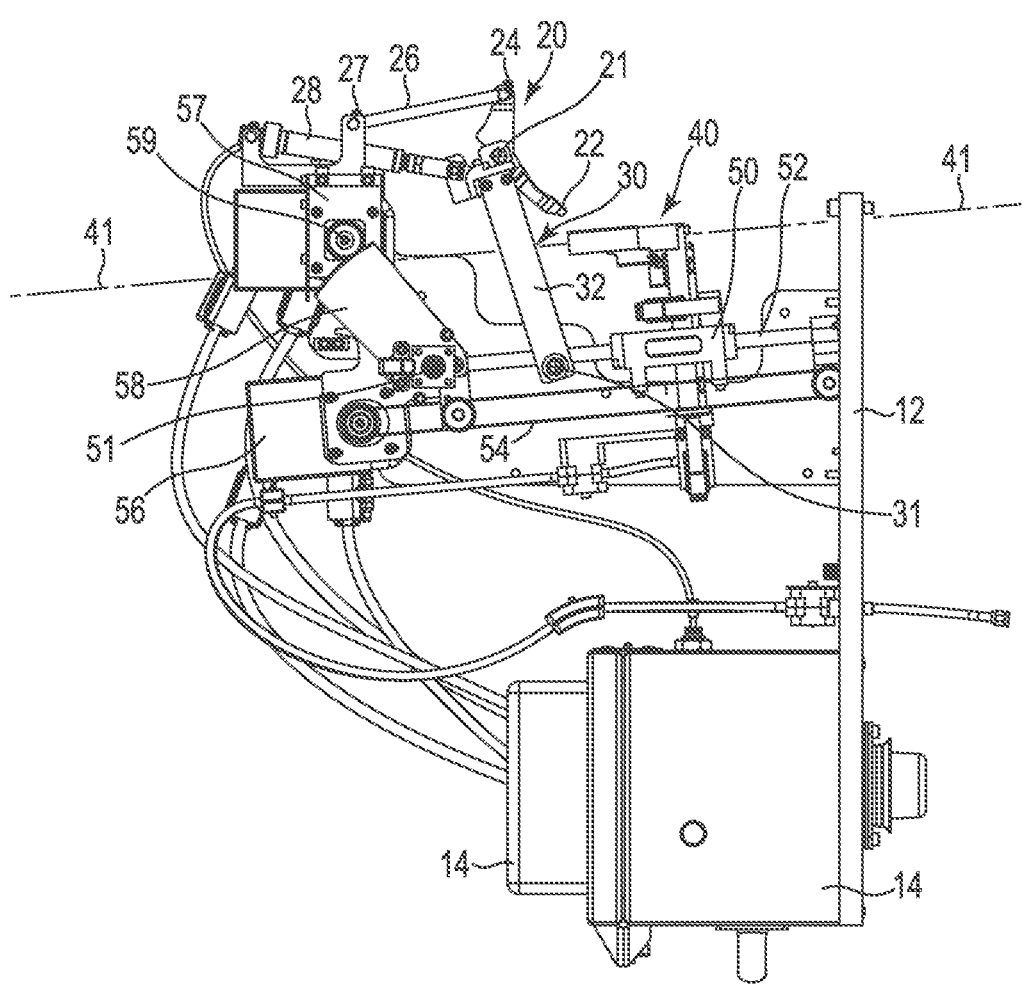
FIG. 4 is a right side view of the poultry toe and claw positioning system of FIGS. 1 and 2 with the right side plate removed to expose components of the poultry toe and claw positioning system.
Figure 5:
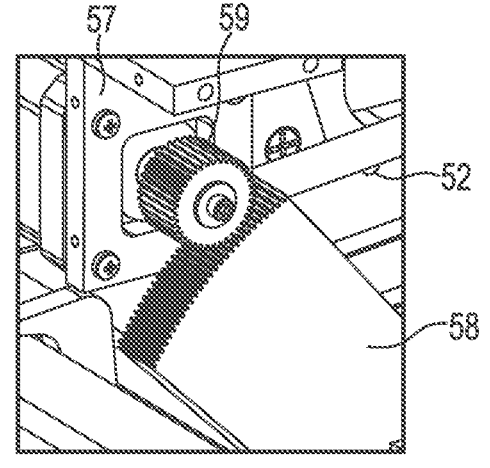
FIG. 5 is an enlarged view of selected components of the poultry toe and claw positioning system depicted in FIG. 4.

FIGS. 1-5 are views of one illustrative embodiment of a poultry toe and claw positioning system 10 that may be used to precisely position the forward-facing toes (and claws thereon) of a bird as described herein. FIG. 1 is a top perspective view of the illustrative system 10, FIG. 2 is a top view of the system 10 and FIG. 3 is a left side view of the system 10 with the left side plate removed to expose components of the poultry toe and claw positioning system. FIG. 4 is a right side view of the system 10 with the right side plate removed to expose additional components of the system 10. FIG. 5 is an enlarged view of selected components of the system 10 depicted in FIG. 4.

The poultry toe and claw positioning system 10 includes a seat lift 20, toe guide 40, and toe guide carriage 50 mounted on a toe guide track which, in the depicted embodiment, is constituted by rail assembly 52. These components are all mounted on a system frame that includes a base plate 12 and pair of side plates 16 attached to and extending away from the base plate 12. In one or more embodiments, the base plate 12 of the system frame may be configured for attachment to a larger system capable of processing many birds. Some illustrative examples of such systems may be described in, e.g., U.S. Pat. No. 7,066,112, titled AUTOMATED POULTRY PROCESSING METHOD AND SYSTEM.

In the depicted illustrative embodiment, the seat lift 20 includes a lift end 22 configured to contact the seat of a bird B restrained in a poultry cradle C10 located in a selected position relative to the system frame and, therefore, the components of the poultry toe and claw positioning system 10. The seat lift 20 is operably attached to the system frame and is configured to move between a ready position (seen in, e.g., FIGS. 1-4, 8, and 17) and a lift position (seen in, e.g., FIGS. 13-16). The depicted seat lift 20 is configured to rotate about a lift axis 21 when moving between the ready position and the lift position, but motion other than rotation can be used to move the seat lift between its ready and lift positions.

In the illustrative embodiment depicted in FIGS. 1-4, the seat lift 20 is attached to and supported on a seat lift support 30. The depicted illustrative embodiment of seat lift support 30 includes a pair of arms 32 and a crossbar 34 extending between the arms 32, with the seat lift 20 attached to and supported on the crossbar 34. The seat lift support 30 is attached to the side plates 16 and configured to rotate about a support axis 31 during movement of the depicted illustrative embodiment of the seat lift 20 between its ready and lift positions. The seat lift support 30 itself can be described as moving between a retracted position and a forward position as the seat lift 20 moves between, respectively, its ready and lift positions. The seat lift support 30 is depicted in its retracted position in, e.g., FIGS. 1-4, 8, and 17 and in its forward position in, e.g., FIGS. 13-16. In the depicted illustrative embodiment, the seat lift support 30 can be described as moving the lift axis 21 (about which the seat lift 20 rotates) when the seat lift support 30 moves between its retracted and forward positions.

The depicted illustrative embodiment of poultry toe and claw positioning system 10 also includes a seat lift actuator 28 that is operably connected to the seat lift 20 and in the depicted illustrative embodiment, also to the seat lift support 30. Operation of the seat lift actuator 28 moves the seat lift support 30 from its retracted position as seen in, e.g., FIG. 1 to its forward position as seen in, e.g., FIG. 13. That same action also causes seat lift 20 to move from its ready position as seen in, e.g., FIG. 1 to its lift position as seen in, e.g., FIG. 13. Seat lift 20 rotates about lift axis 21 while seat lift support 30 is moving from its retracted position to its forward position because the upper end 24 of the seat lift 20 is connected, through link 26, to an anchor 27 fixed in position relative to the system frame and the seat lift actuator 28. As a result, the distance between the upper end 24 of seat lift 20 and anchor 27 is fixed by link 26, with movement of seat lift support 32 its forward position causing seat lift 20 to rotate about lift axis 21.

In the depicted illustrative embodiment, seat lift actuator 28 is in the form of a pneumatic cylinder that extends and retracts to move the seat lift support 30 between its retracted and forward positions which, as described herein, also causes seat lift 20 to move between its ready and lift positions. The depicted illustrative embodiment of seat lift actuator 28 is only one example of an actuator that may be used to move the seat lift 20 and seat lift support 30 between their respective positions. Examples of potentially useful alternative actuators include, but are not limited to, a piston operated hydraulically, using a solenoid, etc.), a motor with or without a gear assembly (e.g., a rack and pinion, etc.), magnetic/electromagnetic actuators, pneumatic rotary actuators, etc.

The depicted illustrative embodiment of poultry toe and claw positioning system 10 also includes a toe guide 40 operably attached to the system frame which, in the depicted illustrative embodiment, includes a base plate 12 and side plates 16. The toe guide includes a capture plate 42 and base 44, with the capture plate 42 attached to the base 44 and the base 44 attached to and supported above a carriage 50. In the depicted embodiment, the base 44 of toe guide 40 is attached to carriage 50 using clamps 48 (see, e.g., FIGS. 2-3).

Figure 19:
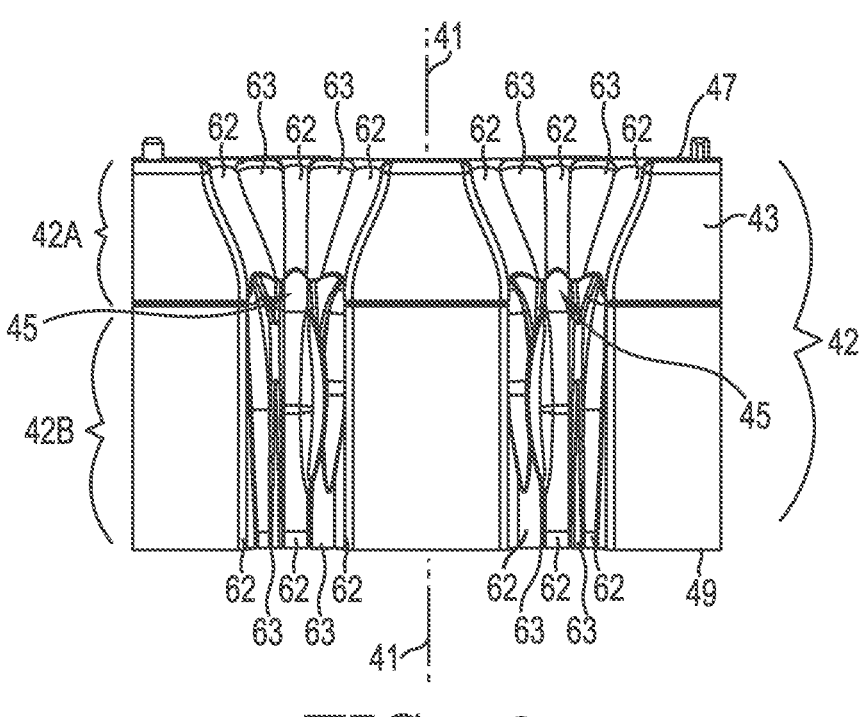
FIG. 19 is a top plan view of the toe guide of FIG. 18.

With reference to FIG. 19 as well as FIGS. 1-4, the depicted illustrative embodiment of toe guide 40 includes a support surface 43 on the capture plate 42, the support surface 43 facing upward away from the carriage 50 with two sets of capture channels 60 formed in the support surface 43. The different sets of capture channels 60 formed in the support surface 43 may correspond to the left and right sets of toes found on a bird.

Although the depicted embodiment includes two sets of capture channels 60 formed in the support surface 43, one or more alternative embodiments may include only a single set of capture channels 60 positioned to capture and align the toes on either the left or right side of a bird. One advantage of providing sets of capture channels for both the left and right sets of toes found on a bird on the same toe guide 40 is that both sets of toes can be positioned at the same time using a poultry toe and claw positioning system as described herein.

The illustrative embodiment of the poultry toe and claw positioning system 10 depicted in FIGS. 1-4 also includes a toe guide track operably attached to the system frame which, in the depicted illustrative embodiment, includes the base plate 12 and side plates 16. In the depicted illustrative embodiment, the toe guide track is defined by a rail assembly 52 including two rails that extend away from the base plate 12 between the side plates 16. Carriage 50 is configured to move along the toe guide track/rail assembly 52.

In the depicted embodiment, carriage 50 is operably attached to a toe guide actuator in the form of a motor assembly 56 configured to operate on a belt 54 aligned with the toe guide axis 41 and rails 52. The carriage 50 is operably attached to the belt 54 such that movement of the belt 54 in a direction aligned with the guide axis 41 moves the carriage 50 and attached toe guide 40 along the guide axis 41.

Although the toe guide actuator is, in the depicted illustrative embodiment, in the form of a motor assembly 56 operating on belt 54, any suitable combination of components configured to move the carriage 50 and attached toe guide 40 along the guide axis 41 could be used in place of the depicted motor assembly 56 and belt 54. Suitable alternatives may include, but are not limited to, pistons or cylinders (e.g., hydraulic, pneumatic, etc.), motor assemblies combined with lead screws and followers, a rack and pinion, magnetic/electromagnetic solenoids, etc.

As will be described herein, the toe guide 40 is mounted on the toe guide track and configured to move along the guide axis 41 between a home position (as seen in, e.g., FIGS. 8, 13, and 17), a capture position (as seen in, e.g., FIGS. 14 and 15), and a finish position (as seen in, e.g., FIG. 16). In the home position, the toe guide 40 is located closer to the lift axis 21 than when in the capture position. The finish position of the toe guide 40 is located between the capture position and the home position. The toe guide actuator which, in the depicted embodiment is constituted by belt 54 and motor assembly 56, is configured to move the toe guide 40 along the guide axis 41 between the home position, the capture position, and the finish position. In one or more embodiments, the finish position may be set at a specific location that can potentially be varied based on anatomical characteristics of a selected set of birds, e.g., birds of a given flock being processed. In one or more alternative embodiments, the finish position may be variable between each bird, with the exact finish position being based on detection of one or more anatomical features of each bird to determine a specific finish position that may vary between each bird.

The depicted illustrative embodiment of the poultry toe and claw positioning system 10 depicted in FIGS. 1-4 also includes a track actuator operably connected to the toe guide track (which, in the depicted embodiment, is in the form of rail assembly 52) and configured to move the toe guide track between a base position and an operating position. Because the toe guide 40 is mounted on carriage 50 which moves along the guide track/rail assembly 52, movement of the guide track/rail assembly 52 between the base and operating positions moves the guide axis 41 along with the toe guide 40 and carriage 50 between those positions as well.

The track actuator in the depicted illustrative embodiment of system 10 is seen in FIGS. 4 and 5 and includes a motor assembly 57 operable on a drive gear 59 which operates on connector arm 58 to rotate connector arm 58 about a track axis 51 such that the ends of the rails 52 of the toe guide track move relative to the base plate 12 from a base position to an operating position. In the operating position, the toe guide track/rail assembly 52 is located closer to the seat lift 20 and lift axis 21 than when the toe guide track/rail assembly 52 is in its base position. Although the depicted embodiment of the toe guide track/rail assembly 52 rotates when moving between the base position and the operating position, in one or more alternative embodiments, the toe guide track/rail assembly 52 and components carried thereon may be moved towards and away from the seat lift 20 and seat lift axis 21 through translational motion or a combination of rotation and translation.

In one or more embodiments, the track actuator operably connected to the toe guide track is configured to move the toe guide track between a base position and a fixed or selected operating position chosen based on one or more anatomical features for a selected set of birds, e.g., birds of a given flock, etc. In one or more alternative embodiments, the operating position may be variable between each bird, with the exact operating position being based on detection of one or more detected anatomical features of each bird, the force exerted on the forward-facing toes of each bird by the toe guide (using, e.g., a torque sensor sensing torque at the motor assembly 57), etc. to determine a specific operating position that may vary between each bird.

Although motor assembly 57, connector arm 58, and drive gear 59 form one illustrative embodiment of a track actuator that may be used in one or more embodiments of the poultry toe and claw positioning systems described herein, the track actuators used in the poultry toe and claw positioning systems described herein may take many other forms including, but not limited to, pistons or cylinders (e.g., hydraulic, pneumatic, etc.), motor assemblies combined with lead screws and followers, a rack and pinion, magnetic/electro-magnetic solenoids, etc.

In the depicted illustrative embodiment of poultry toe and claw positioning system 10, the motor assemblies 56 and 57 may be in the form of stepper motors operably connected to a controller 14 as described herein. In one or more alternative embodiments, however, motor assemblies 56 and 57 may be provided in the form of other electric motors, pneumatic motors, hydraulic motors, etc.

Figure 6:
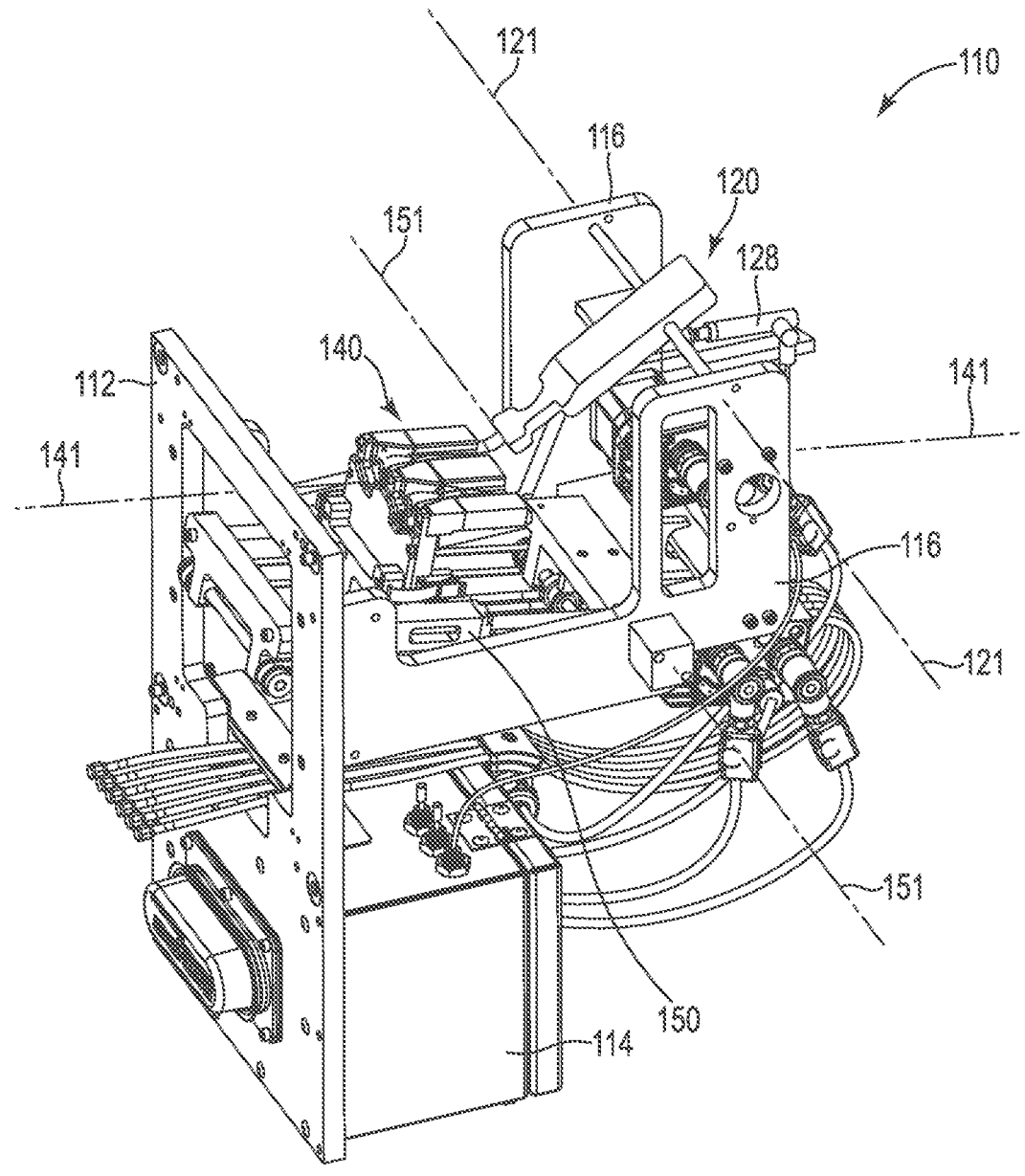
FIG. 6 is a top perspective view of another illustrative embodiment of a poultry toe and claw positioning system as described herein.
Figure 7:
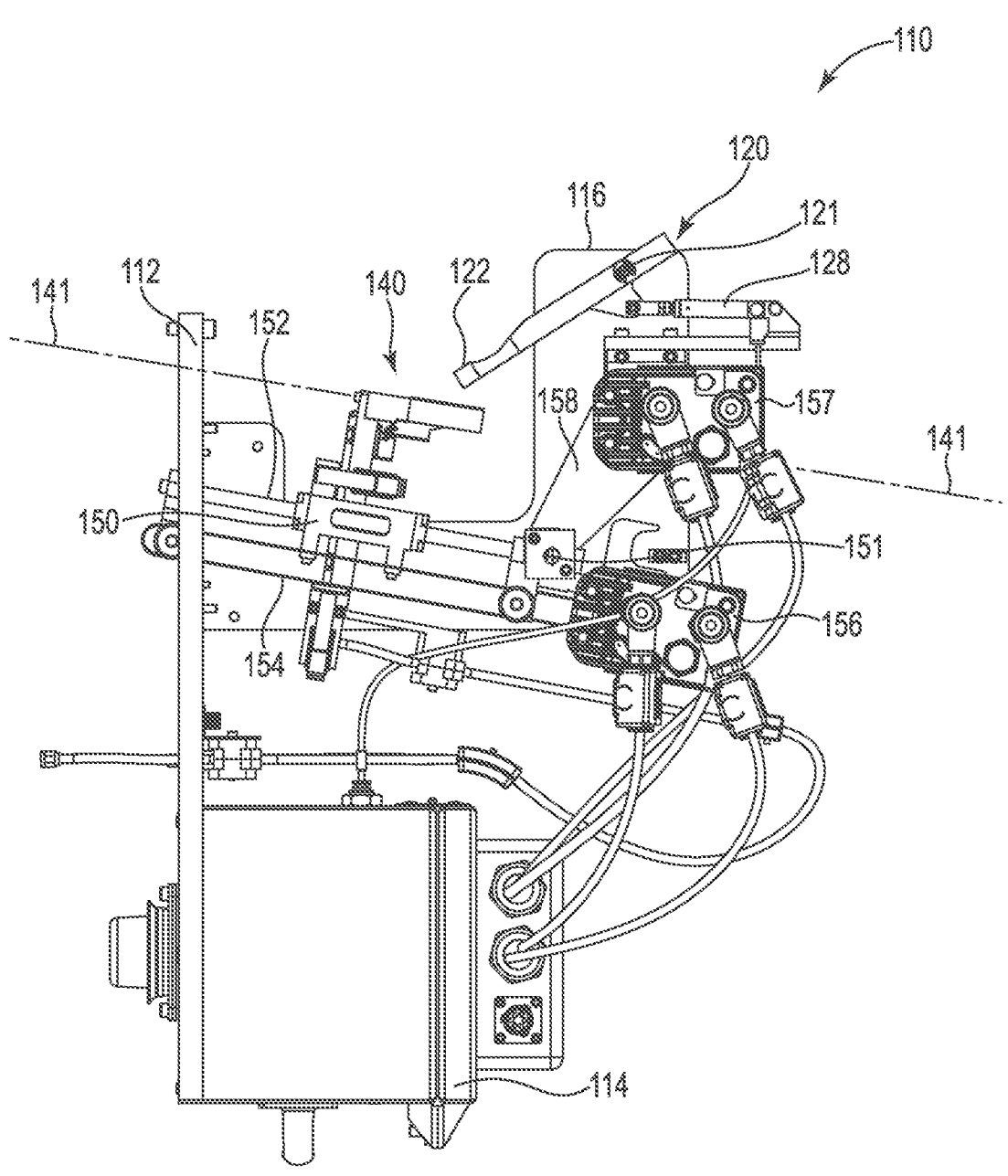
FIG. 7 is a left side view of the poultry toe and claw positioning system of FIG. 6 with the left side plate removed to expose components of the poultry toe and claw positioning system of FIG. 6.

One alternative illustrative embodiment of a poultry toe and claw positioning system 110 is depicted in FIGS. 6-7. In many respects, the system 110 is similar to system 10 depicted in FIGS. 1-5. For example, system 110 includes a base plate 112 and a pair of side plates 116 along with a controller 114. System 110 also includes a toe guide 140 configured to move along a guide axis 141 in a manner similar to that described above with respect to toe guide 40 and guide axis 41, with toe guide 140 positioned on a carriage 150 configured to move along rails 152 using a belt 154 driven by a motor assembly 156. Further, system 110 also includes a track actuator configured to rotate the rails 152 forming the toe guide track along which toe guide 40 moves, with the track actuator including a connector arm 158 driven by a motor assembly 157 used to rotate guide rails 152 about a track axis 151.

One difference between the poultry toe and claw positioning system 110 of FIG. 6-7 and the poultry toe and claw positioning system 10 of FIGS. 1-5 is that the seat lift 120 (including lift end 122) of system 110 is configured to move between its ready and lift positions by simple rotation about the lift axis 121 which is fixed relative to side plates 116 in the remainder of the system frame. As a result, seat lift actuator 128 operates only on seat lift 120 with no seat lift support provided as discussed above in connection with poultry toe and claw positioning system 10.

Figure 8:
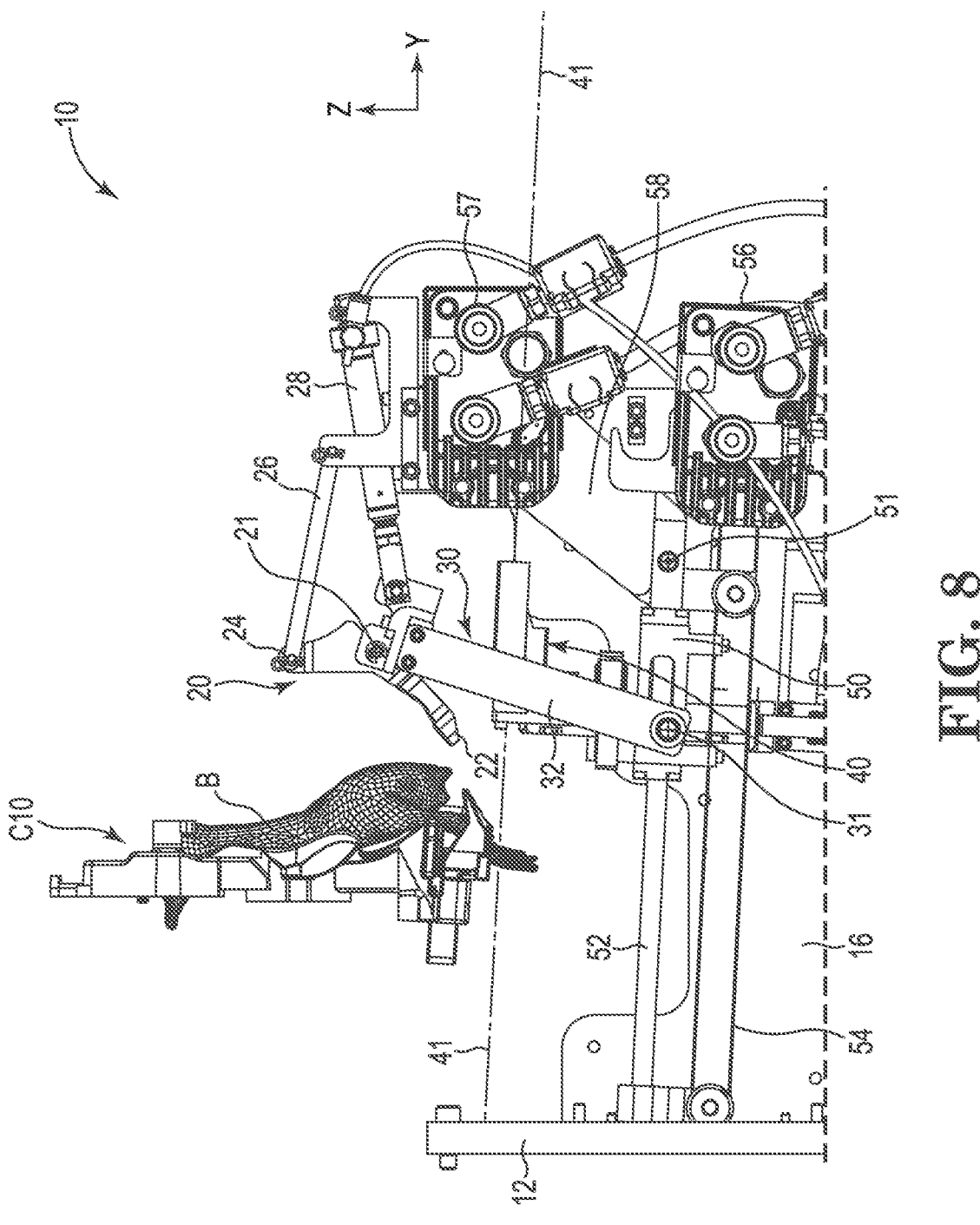
FIG. 8 is a left side view of the poultry toe and claw positioning system of FIGS. 1-3, with a bird restrained in a poultry cradle in a selected position relative to the system.
Figure 9:
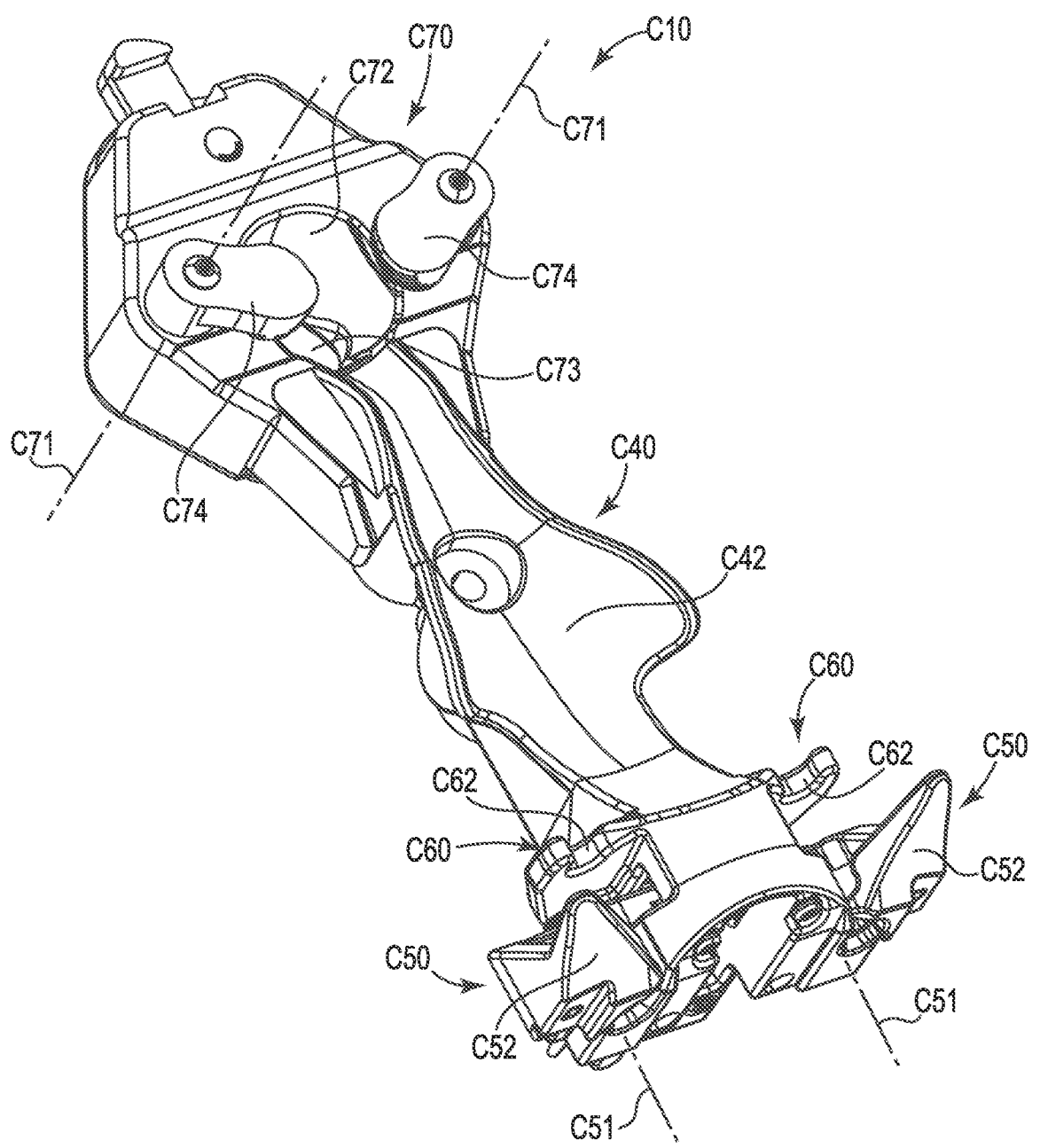
FIG. 9 is a perspective view of one illustrative embodiment of a poultry cradle that can be used in connection with the poultry toe and claw positioning systems as described herein.
Figure 10:
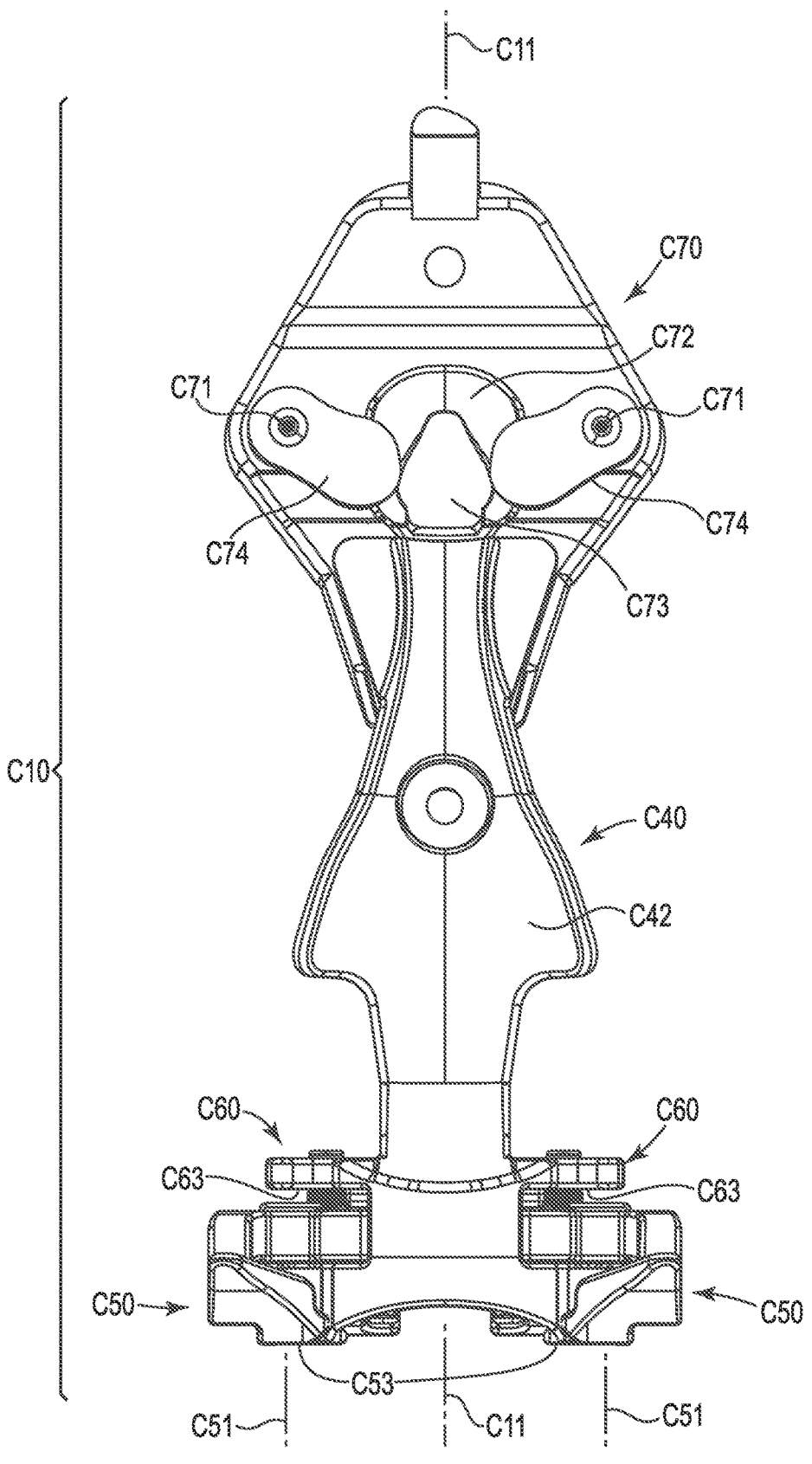
FIG. 10 is front plan view of the poultry cradle of FIG. 9.
Figure 11:
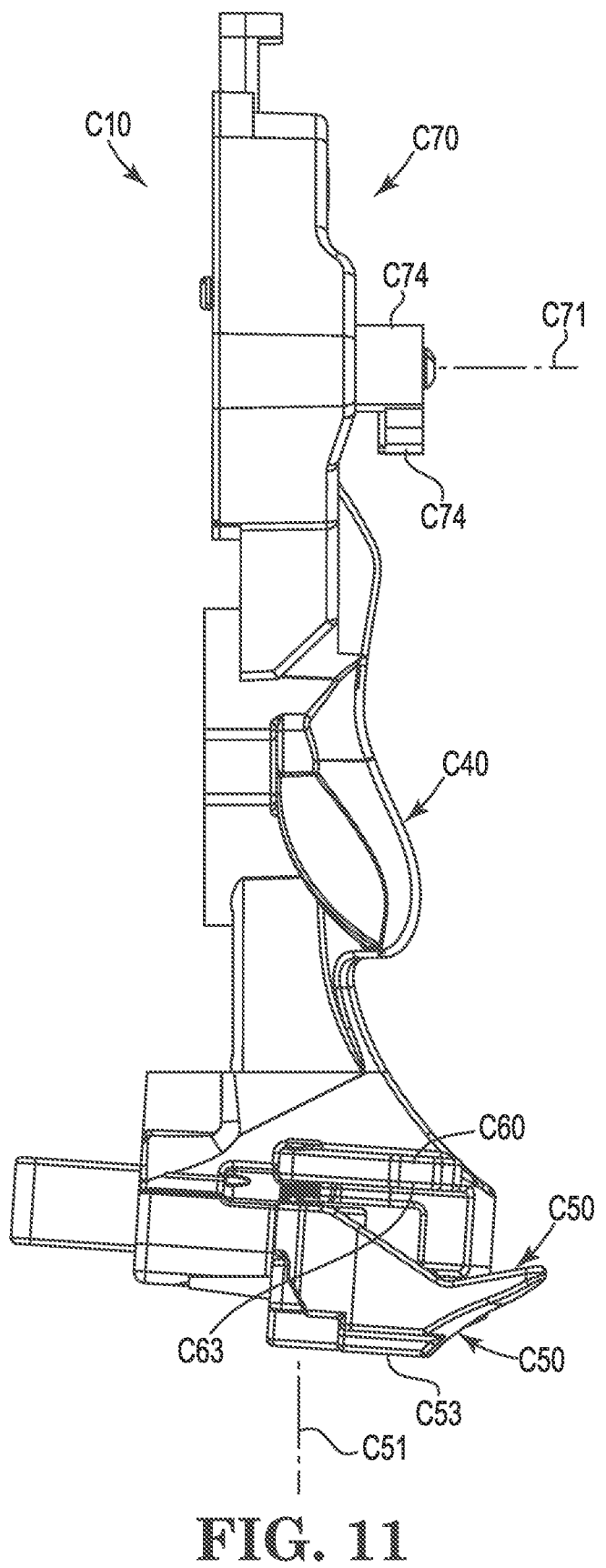
FIG. 11 is a side plan view of the poultry cradle of FIG. 9.

The illustrative embodiment of poultry toe and claw positioning system 10 is depicted in FIG. 8 along with a poultry cradle C10 in which a bird B is restrained (preferably atraumatically). The poultry cradle C10 is located in a selected position relative to the system frame (i.e., represented by base plate 12 and side plate 16 in FIG. 8) such that the seat lift 20 and toe guide 40 can be used to precisely position the toes and claws of the bird B restrained in the poultry cradle C10. Although depicted in space, i.e., not attached to any other components, it should be understood that the poultry cradle C10 will preferably be carried on a carrier system such as, e.g., a belt, chain, etc. In some embodiments, however, the poultry cradle C10 may be manually placed on a stationary holder such that the poultry cradle C10 is in the selected position relative to the system frame.

The illustrative embodiment of poultry cradle C10 is depicted separately in FIGS. 9-12 in the absence of the bird B as seen in FIG. 8. The poultry cradle C10 is depicted in a perspective view in FIG. 9, a front plan view in FIG. 10, and a side plan view in FIG. 11 (similar to the view of cradle C10 in FIG. 8). The end of the poultry cradle is depicted in an enlarged view in FIG. 12. The depicted poultry cradle C10 includes a torso support C40, a pair of shank control apparatus each including a shank clamp C50 and an optional shank guide C60, and an optional head support C70. The various components may be operably attached in a manner that provides for atraumatic restraint of a bird positioned in the poultry cradle C10.

In one or more embodiments, the torso support C40 includes a support surface C42 shaped to generally follow the anatomical shape of the torso of a bird located in the poultry cradle C10 such that the torso of the bird is generally evenly supported. As a result, the shape of the support surface C42 may be different depending on the breed, age, gender, etc. of the birds that are to be restrained in the poultry cradle C10.

The shank control apparatus are provided and positioned to restrain the left and right shanks of a bird having its torso supported by the torso support C40. Each shank control apparatus includes a shank clamp C50 positioned to retain a shank of a bird at a location below the joint commonly referred to as the "hock" joint and above the joints of the forward-facing toes at the distal/inferior end of the shank, while the optional shank guide C60 is positioned to act on the shank above or proximal/superior to the shank clamp C50.

While the shank clamps C50 prevent the bird from moving its shank in any direction other than along the length of its shank (aligned with axes C51), the depicted illustrative embodiments of shank guides C60 can help to limit or prevent movement of the shanks contained therein along the lateral and medial directions of the restrained bird. The shank guides C60 include a slot C62 configured to receive a shank of bird positioned in the shank clamp C50 located below/inferior to the shank guide C60. Because the shank guide is in the form of a slot C62, the shank guide C60 alone cannot restrain movement of a shank of a restrained bird in the dorsal direction.

The combined two-point restraint of the shanks by the shank clamps C50 and shank guides C60 (in addition to supporting their torsos and restraining their heads) can provide additional control over the hock joints of a restrained bird at the proximal/superior ends of the shanks and the forward-facing toes (i.e., phalanges) located at the distal/inferior ends of the shanks. That additional control over the shanks and forward-facing toes/phalanges may be needed when, for example, the claws of the birds are to be accurately positioned using a poultry toe and claw positioning system as described herein.

Figure 12:
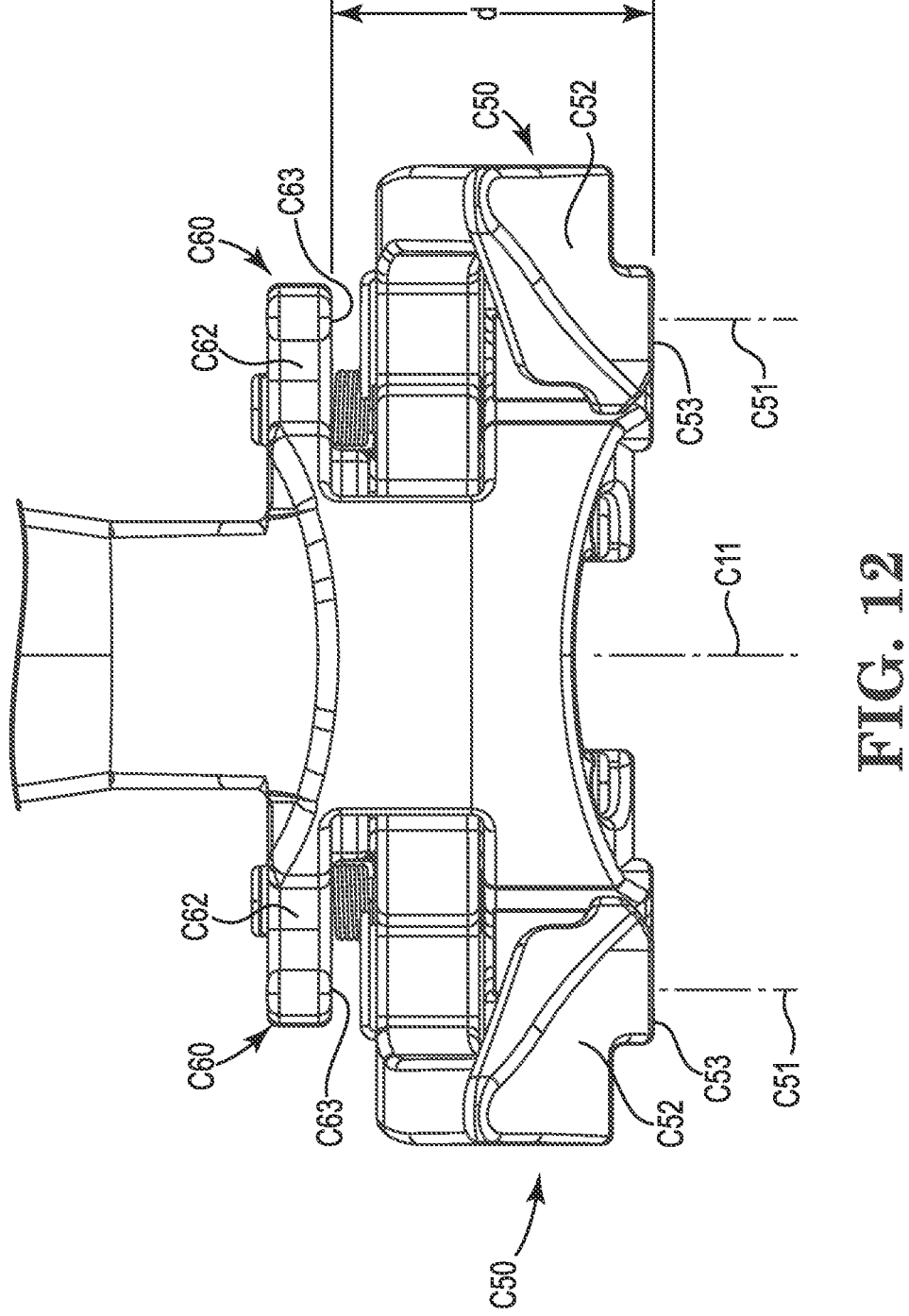
FIG. 12 is an enlarged view of the shank guides and shank clamps of the poultry cradle of FIG. 9.

Spacing between the inferior/distal/bottom side C53 of the shank clamps C50 and the inferior/distal/bottom side C63 of the shank guides C60 may be helpful for larger birds. With reference to FIG. 12, the spacing d (along axes C51) between the inferior/distal/bottom side C63 of the shank clamp C50 from the inferior/distal/bottom side C63 of the shank guide C60 may improve control over the shank of a duck or a turkey hatchling that would otherwise not be available in the absence of a shank guide and/or if the shank guide and the shank clamp were located closer to each other.

In one or more embodiments, the distance between an inferior/distal/bottom side C53 of the shank clamp C50 and the inferior/distal/bottom side C63 of the shank guide C60 along a longitudinal (superior/inferior) axis C11 extending through the head support C70 and the torso support C40 is, at a lower end, 5 millimeters or more, 1 centimeter or more, or 2 centimeters or more.

In one or more embodiments, the distance between an inferior/distal/bottom side C53 of the shank clamp C50 and the inferior/distal/bottom side C63 of the shank guide C60 along a longitudinal (superior/inferior) axis C11 extending through the head support C70 and the torso support C40 is, at an upper end, 3 centimeters or less, 2 centimeters or less, or 1 centimeter or less.

In one or more embodiments, the shank clamps C50 may include arms C52 that move between open configurations in which the shanks of a bird can be positioned in the shank clamps C50 and closed configurations in which the shanks of the bird are retained in the shank clamps C50. Although the depicted shank clamps C50 include arms C52, other structures (such as, e.g., inflatable bladders, etc.) may be used to retain a bird's shanks in the shank clamps when the clamps C50 are in the closed configuration.

The shank clamps C50 may be normally closed but constructed such that they open in response to the forces generated as a shank is being inserted into the shank clamp C50 (the shank clamps C50 may be, e.g., spring-loaded, etc.). In other embodiments, the shank clamps C50 may have defined open and closed configurations between which the clamps can be moved to accept and/or retain a shank of a bird being restrained. In one or more embodiments, the arms C52 of the shank clamps may rotate about clamp axes C51 when moving between the open and closed configurations.

The poultry cradles C10 may also include a head support C70 operably attached to the torso support C40 and positioned to support the head of a bird located in the poultry cradle C10. The head support C70 includes a first side facing the head of a bird retained in the poultry cradle C10. The head support C70 may preferably include a beak receiving passage C72 extending through the head support C70 to an opening C73 on the second side of the head support C70. In one or more embodiments, the beak receiving passage C72 preferably extends through the head support C70 such that at least a portion of the beak of a bird retained in the poultry cradle C10 extends through the opening C73 of the beak receiving passage C72 and is exposed proximate the second surface of the head support C70 (where the second side of the head support C70 faces away from the head of a bird retained in the poultry cradle C10).

The head support C70 may include head clamps C74 movable between an open configuration and a closed configuration. In the open configuration, the head clamp C74 is preferably positioned such that the head of a bird can be positioned in the head support C70 with the beak preferably extending through the beak receiving passage C72 and preferably protruding from the opening C73 on the second side of the head support C70. In the closed configuration, the head clamps C74 preferably function to retain the head of a bird in the head support C70 such that its beak extends into the beak receiving passage C72 and preferably protrudes through the opening C73 on the second side of the head support. The head clamps C74 may rotate about head clamp axes C71 when moving between their open and closed configurations.

Structures similar to the head support C70 and clamps C74 may be described in, e.g., U.S. Pat. No. 5,651,731 titled METHOD AND APPARATUS FOR DEBEAKING POULTRY; U.S. Pat. No. 7,232,450 titled APPARATUS AND METHOD FOR UPPER AND LOWER BEAK TREATMENT; U.S. Patent Application Publication US 2005/0101937 A1 titled APPARATUS AND METHOD FOR NASAL DELIVERY OF COMPOSITIONS TO BIRDS; U.S. Pat. No. 7,363,881 titled BEAK TREATMENT WITH TONGUE PROTECTION; etc. Another illustrative embodiment of a head clamp used with a head holder in a poultry cradle includes the keeper apparatus described in U.S. Pat. No. 9,808,328 (POULTRY CARRIERS AND METHODS OF RESTRAINING POULTRY). Other examples of suitable structures for head clamps are also possible.

As noted above, the poultry toe and claw positioning system 10 is depicted in FIG. 8 with bird B restrained in the poultry cradle C10 located in a selected position relative to the poultry toe and claw positioning system 10. The seat lift 20 of system 10 is located in its ready position, seat lift support 30 is in its retracted position, and toe guide 40 is located in its home position as described above in connection with poultry toe and claw positioning system 10.

Figure 13:
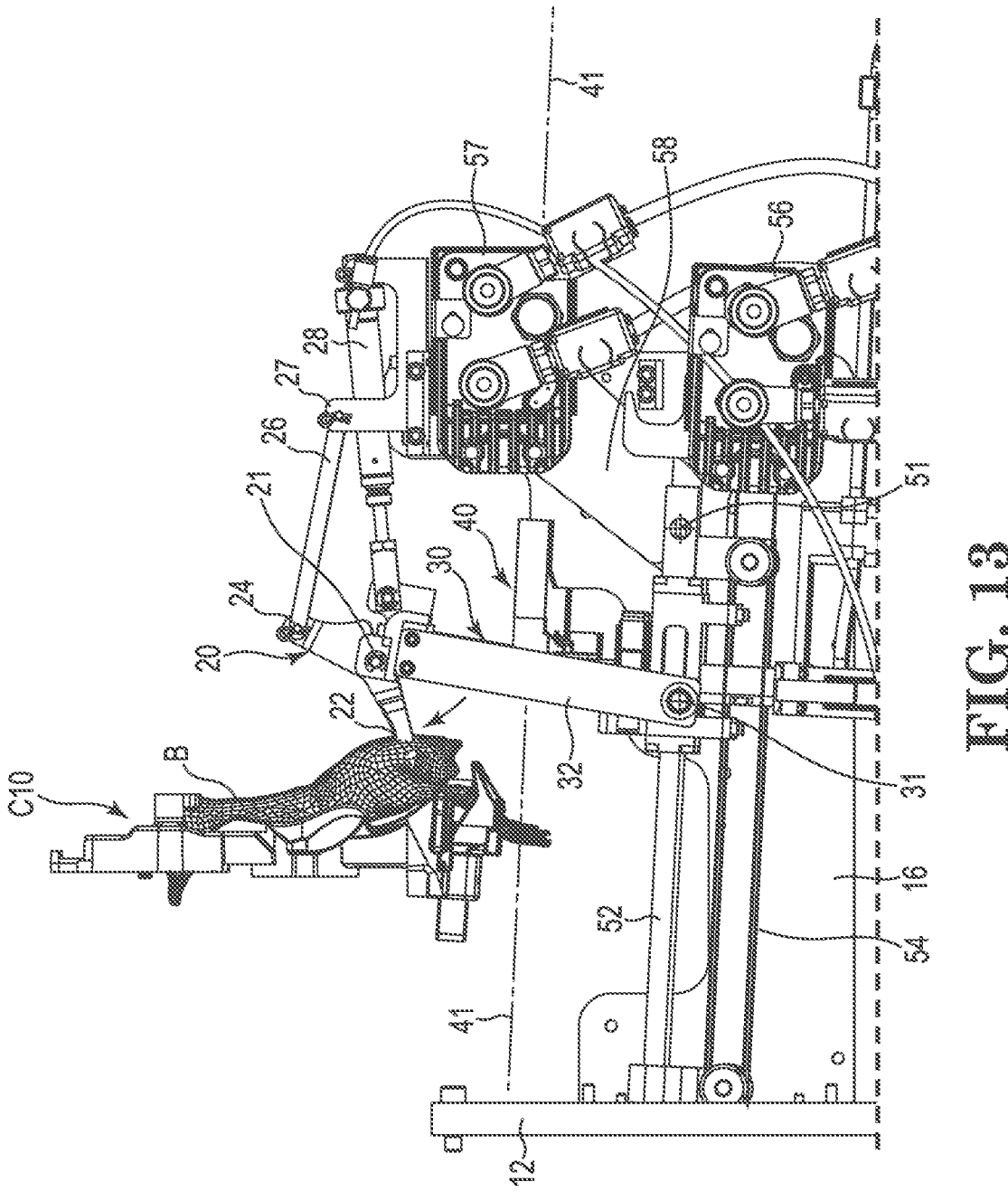
FIG. 13 depicts the poultry toe and claw positioning system of FIG. 8 after movement of a seat lift to act on the bird restrained in the poultry cradle.

Referring to FIG. 13, the seat lift 20 is moved from its ready position to its lift position where it acts on the seat of the bird B to raise the seat of the bird B causing the shanks of the bird B to move upward. For purposes of the present invention, the seat of the bird is located proximate the cloaca or vent of the bird and is located to allow for positioning of a bird B in a cradle as described herein. Movement of the seat lift 20 to its lift position raises the shanks of the bird B such that the forward-facing toes of the bird B and the distal/inferior ends of the shanks of the bird B are moved to a location just below the inferior/distal/bottom sides C53 of the shank clamps C50. As a result, the forward-facing toes of the bird B are positioned in a known location relative to the remainder of the poultry toe and claw positioning system 10. With the forward-facing toes positioned in that known location, the toe guide 40 can be moved relative to that known location of the forward-facing toes of the bird B for positioning as described herein.

In the depicted illustrative embodiment of poultry toe and claw positioning system 10, movement of the seat lift 20 from its ready position to its lift position is accomplished using seat lift actuator 28. In particular, seat lift actuator 28 is extended which forces the seat lift support 30 to rotate about support axis 31 from its retracted position as seen in FIG. 8 to its forward position as seen in FIG. 13. As the seat lift support 30 rotates from its retracted position to its forward position, the seat lift 20 is also rotated about lift axis 21. Seat lift 20 rotates about lift axis 21 while seat lift support 30 is rotating about support axis 31 because the upper end 24 of the seat lift 20 is attached to anchor 27 by link 26. Link 26 fixes the distance between the anchor 27 and the upper end 24 of seat lift 20, thus causing the seat lift 22 rotate about axis 21 as the seat lift support 30 moves to its forward position. That rotation of seat lift 20 causes the lift end 22 to contact and raise the bird B restrained in the poultry cradle C10. As noted above, movement of the bird by seat lift 20 positions the forward-facing toes of the bird in a known location relative to the remainder of the poultry toe and claw positioning system 10.

After actuation of the seat lift 20 to raise the bird B in the poultry cradle C10 as discussed in connection with FIG. 13, the toe guide 40 is moved from its home position as seen in, e.g., FIG. 13 to its capture position along guide axis 41. As discussed herein, movement of the depicted embodiment of toe guide 40 along guide axis 41 is accomplished using carriage 50 mounted on rail assembly 52 and driven by the toe guide actuator including motor assembly 56 and belt 54. Movement of the toe guide 40 along the guide axis 41 from the home position as seen in FIG. 13 to the capture position as seen in FIG. 14 involves moving the toe guide 40 in a capture direction along the guide axis 41.

Moving the toe guide 40 in the capture direction along guide axis 41 when the bird B is located in poultry cradle C10 in the selected position positions the forward-facing toes of the bird B in the capture channels 60 (see, e.g., FIGS. 2 and 19) on the support surface 43 of the toe guide 40 in one or more embodiments, each forward-facing toe is located in a separate capture channel of the plurality of capture channels 60. In the depicted embodiment, each set of capture channels 60 converge when moving along the support surface 43 away from the leading edge 47 of the toe guide 40 and the open ends of the capture channels 60 at that leading edge 47 (where the open ends of the capture channels 60 are those ends positioned along the leading edge 47 as seen in, e.g., in FIGS. 2 and 19). Convergence of the capture channels 60 assists in properly positioning and aligning one of the forward-facing toes in each of the capture channels for proper positioning of the toes and their respective claws as described herein.

Figure 14:
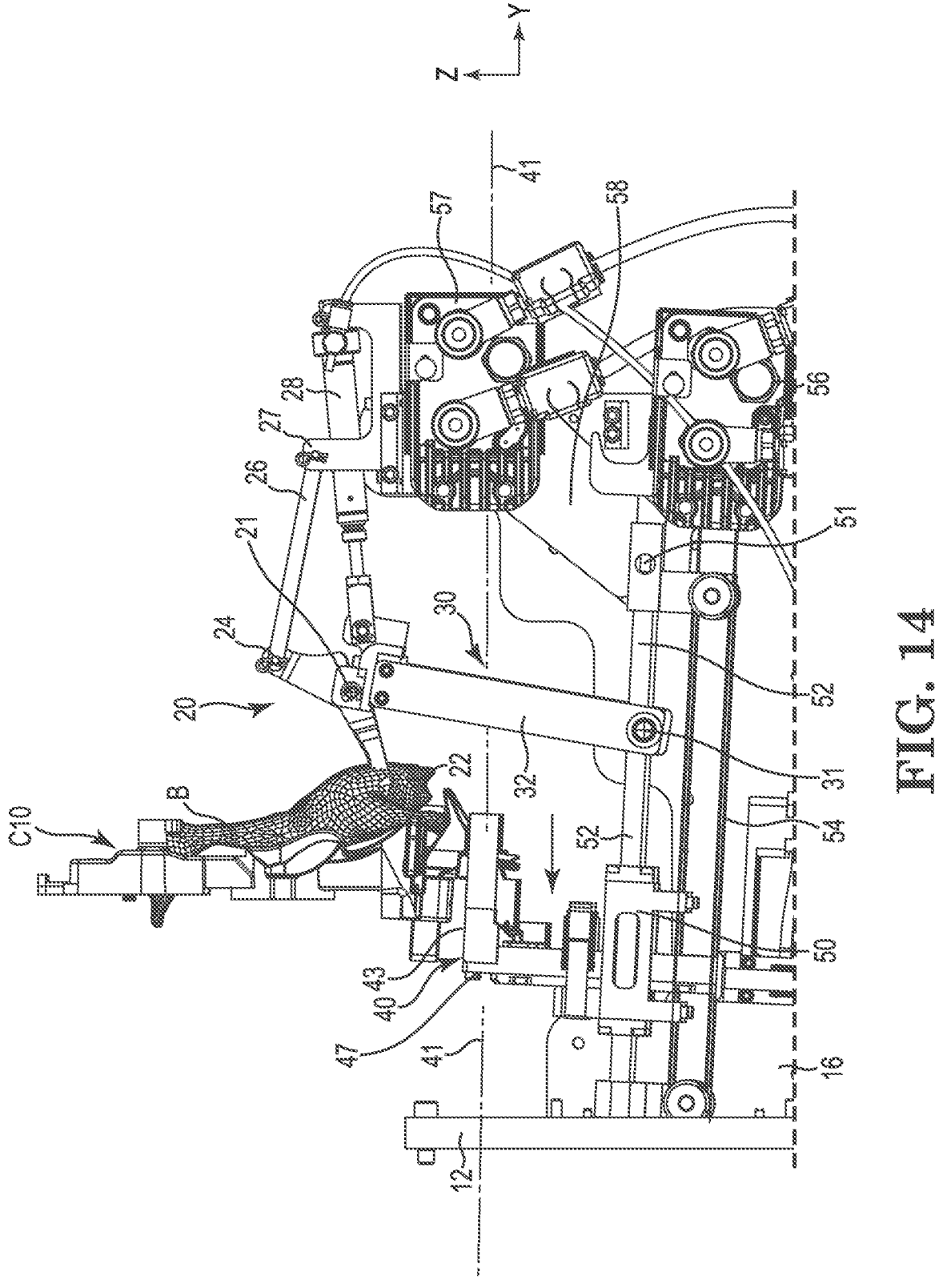
FIG. 14 depicts the poultry toe and claw positioning system of FIG. 13 after movement of the toe guide along the guide axis to a capture position from the home position as depicted in FIG. 13.

While movement of the toe guide 40 in the capture direction along guide axis 41 to its capture position as seen in FIG. 14 causes the forward-facing toes of the bird B to contact the support surface 43 of the toe guide 40 and position the forward-facing toes in the capture channels 60 as described herein, one or more embodiments of poultry toe and claw positioning systems described herein may further involve positioning the toe guide track (as represented by the rail assembly 52 in the depicted illustrative embodiment of system 10) from a base position to an operating position. In the operating position, the toe guide track/rail assembly 52 and toe guide 40 are moved closer to the poultry cradle C10 and, therefore, the forward-facing toes of the bird B restrained in the poultry cradle C10.

Figure 15:
FIG. 15 depicts the poultry toe and claw positioning system of FIG. 14 after movement of the toe guide track towards the poultry carrier.

In the depicted illustrative embodiment of poultry toe and claw positioning system 10, movement of the toe guide track/rail assembly 52 and toe guide 40 from the base position to the operating position can be seen by comparing the position of the toe guide 40 from FIG. 14 to FIG. 15. In FIG. 14, the toe guide track/rail assembly 52 is depicted in its base position after movement of the toe guide 42 its capture position as described herein. In FIG. 15, the toe guide track/rail assembly 52 is depicted in its operating position after movement of the toe guide track/rail assembly 52 upward towards the poultry cradle C10.

That upward movement of the toe guide 40 caused by moving the toe guide track/rail assembly 52 from its base position in FIG. 14 to its operating position in FIG. 15 may assist in properly aligning the forward-facing toes of the bird B in the capture channels 60 on the toe guide 40. Control over movement of the toe guide track/rail assembly 52 from its base position to its operating position may, in one or more embodiments, be controlled based on the pressure exerted on the toe guide 40 by the forward-facing toes of the bird B. That pressure may, in the depicted embodiment, be detected based on torque measured in the motor assembly 57 of the track actuator used to move the toe guide track/rail assembly 52 into the operating position. Many other techniques for measuring and/or limiting the pressure exerted by the forward-facing toes of the bird on the toe guide 40 could, of course, be substituted for the torque measurement used in the depicted illustrative embodiment of poultry toe and claw positioning system 10, including, but not limited to, pressure sensors (positioned, for example, between the toe guide 40 and carriage 50), spring-loading the toe guide 40 on the carriage 50, etc.

Figure 16:
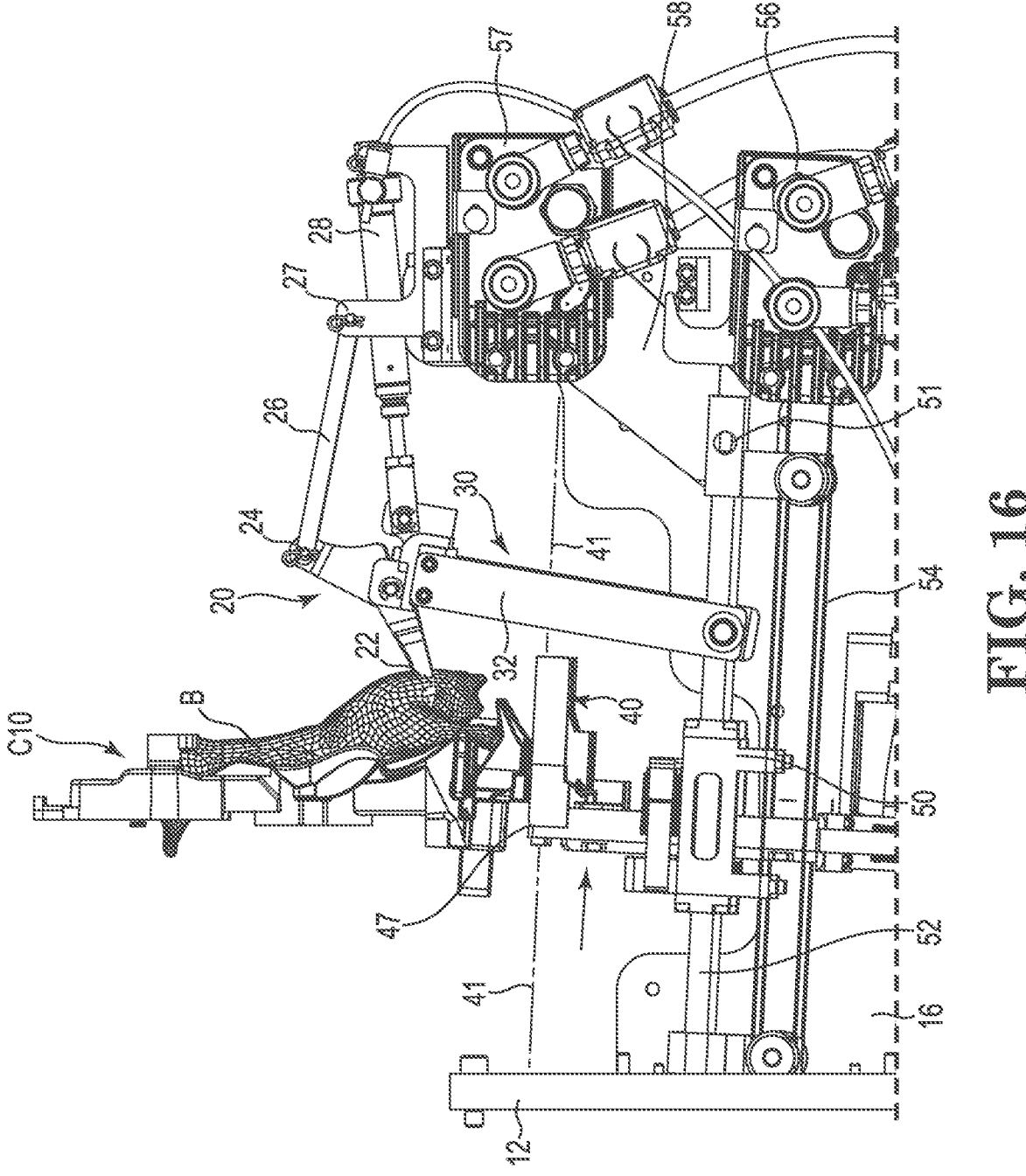
FIG. 16 depicts the poultry toe and claw positioning system of FIG. 15 after movement of the toe guide along the guide axis to a finish position from the capture position as depicted in FIG. 15.

With the toe guide 40 in its capture position along the guide axis 41 and the toe guide track/rail assembly 52 in its operating position as seen in FIG. 15, the toe guide 40 may be advanced in a finish direction that is opposite the capture direction along the guide axis 41 to its finish position as seen in FIG. 16. The finish position of the toe guide 40 along guide axis 41 is located between the home position (as seen in, for example, FIG. 13) and its capture position (as seen in for example, FIG. 15). As described herein, it is in the finish position that the toes and claws of the bird B in poultry cradle C10 are positioned as desired in toe guide 40.

As discussed herein, the finish position of toe guide 40 may be set at a specific location along guide axis 41 that can be varied based on anatomical characteristics of a selected set of birds, e.g., birds of a given flock being processed. In one or more alternative embodiments, the finish position of toe guide 40 along guide axis 41 may be variable between each bird, with the exact finish position being based on detection of one or more anatomical features of each bird to determine a specific finish position that may vary between each bird.

Figure 17:
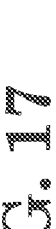
FIG. 17 depicts the poultry toe and claw positioning system of FIG. 16 after movement of the toe guide along the guide axis to its home position along with movement of the toe guide track away from the poultry carrier and movement of the seat lift away from the bird restrained in the poultry cradle.

After processing of the poultry toes and/or claws of the bird B in poultry cradle C10 while the components of the poultry toe and claw positioning system 10 are in the processing position as seen in FIG. 16, the components of the poultry toe and claw positioning system 10 are returned to their respective starting positions as seen in FIG. 17. In the depicted illustrative embodiment of poultry toe and claw positioning system 10, the motor assembly 57 and connector arm 58 of the track actuator are used to rotate the toe guide track/rail assembly 52 about track axis 51 to move the toe guide track/rail assembly 52 from its operating position as seen in FIG. 16 to its base position as seen in FIG. 17. In addition, the toe guide 40 is moved along guide axis 41 from its finish position as seen in FIG. 16 to its home position as seen in, e.g. FIG. 13 using, in the depicted illustrative embodiment, the motor assembly 56 and belt 54 of the toe guide actuator. Further, the seat lift 20 is moved from its lift position as seen in FIG. 16 to its ready position as seen in FIG. 17. Movement of the seat lift 20 from its lift position to its ready position also involves, in the depicted illustrative embodiment, movement of the seat lift support 30 from its forward position as seen in FIG. 16 to its retracted position as seen in FIG. 17. In the depicted illustrative embodiment, seat lift 20 rotates about lift axis 21 during its movement from the lift position to the ready position while the seat lift support 30 rotates about the support axis 31 during its movement from the forward position to the retracted position. With processing complete, the bird B in the poultry cradle C10 can be moved out of the selected position.

Figure 18:
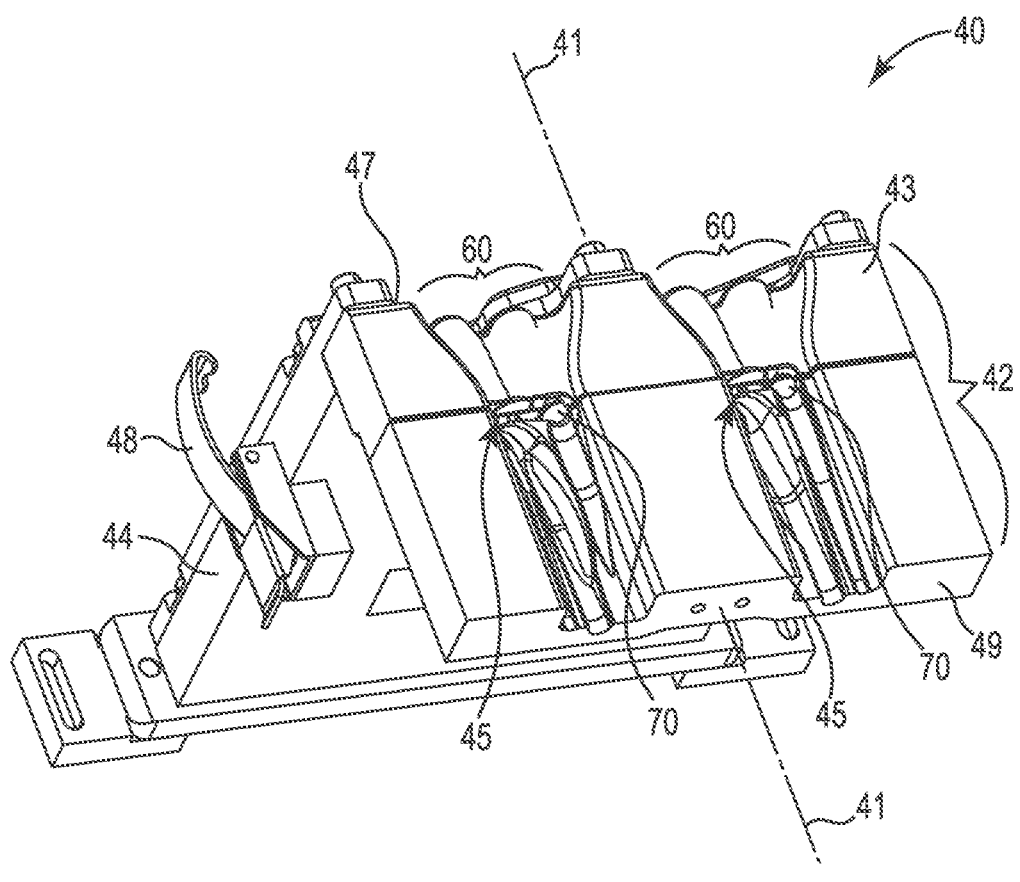
FIG. 18 is a top perspective view of one illustrative embodiment of a toe guide that can be used in one or more embodiments of a poultry toe and claw positioning system as described herein.

The illustrative embodiment of toe guide 40 seen in connection with the illustrative embodiments of poultry toe and claw positioning systems 10 and 110 described herein is depicted in enlarged views in FIGS. 18-26. In particular, FIG. 18 depicts the capture plate 42 of toe guide 40 as attached to the base 44 of toe guide 40. As discussed herein, base 44 of toe guide 40 is mounted on the carriage 50 of the illustrative embodiments of poultry toe and claw positioning systems described herein.

As also described herein, the depicted illustrative embodiment of capture plate 42 of toe guide 40 contains two sets of capture channels 60 formed in the support surface 43. Each set of capture channels 60 formed in the support surface 43 is configured to receive and capture the forward-facing toes on one shank of a bird. Although the depicted embodiment of toe guide 40 includes two sets of capture channels 60, one or more alternative embodiments of toe guides that may be used in poultry toe and claw positioning systems described herein may include only one set of channels configured to capture the forward-facing toes on only one shank of a bird. In embodiments such as that seen in, e.g., FIGS. 18-19, the two sets of capture channels 60 are provided to simultaneously receive and capture the forward-facing toes on both the left and right shank of a bird.

With reference to FIG. 19, each set of capture channels 60 includes a plurality of channels 62 with adjacent pairs of channels 62 separated from each other by ridges 63 such that only one forward-facing toe of a bird is received within each of the capture channels 62. In the depicted embodiment, the capture channels 62 each comprise an open end at the leading edge 47 of the capture plate 42 of the toe guide 40. That open end of each capture channel 62 is configured to receive a toe and claw of a bird as the toe guide 40 is moved in the capture direction along guide axis 41. In, for example, FIG. 19 the capture direction would be upwards towards the top of the page. Also as seen in FIGS. 18-19, the capture channels 62 within each set of capture channels 60 converge when moving away from the open ends of the capture channels 62.

In one or more embodiments, the converging capture channels 62 and ridges 63 effectively separate and align the forward-facing toes on one shank of the bird as the forward-facing toes are received in the open ends of channels 62 on leading edge 47 and move along the support surface 43 towards the trailing edge 49 of the capture plate 42.

Although the depicted embodiment of toe guide 40 includes three capture channels 62 in each set of capture channels 60, in one or more alternative embodiments, the toe guides used in poultry toe and claw positioning systems as described herein may include sets of capture channels that have as few as two capture channels or four or more capture channels. The number of capture channels in each set of capture channels may be selected based on the number of forward-facing toes (and claws thereon) to be positioned using the poultry toe and claw positioning system. For example, one or more species of chickens may have five forward-facing toes and a poultry toe and claw positioning system designed to position all five toes and claws as described herein may include five capture channels in each set of capture channels.

Each set of capture channels 60 converges as described herein on support surface 43 of capture plate 42 until the capture channels 62 within each set of capture channels 60 may be described as being generally parallel with each other (although some convergence and/or divergence in the capture channels 62 within each set of capture channels 60 may be acceptable).

The capture channels 62 in each set of capture channels 60 converge at and are interrupted by a guide opening 45 located between the converging portions of the capture channels 62 and the generally parallel portions of the capture channels 62 in each set of capture channels 60. Within each set of capture channels 60, the guide opening 45 provides access to a set of guide channels that extend from the guide opening 45 through the capture plate 42. Each guide channel of the set of guide channels extending from each of the guide openings 45 extends through the support plate 42 from a receiving aperture in the guide opening to a claw aperture located distal from the receiving aperture (on the opposite surface of the support surface 43 of the capture plate 42. Each set of guide channels diverges when moving from the receiving apertures of the guide channels to the claw apertures of the guide channels.

To move the forward-facing toes on a shank of a bird into the guide channels, the toe guide 40 is, as described herein, first moved in a capture direction along the guide axis 41 relative to the bird B to capture and align the forward-facing toes of the bird B in the set of capture channels 60. The toe guide 40 is moved in the capture direction until the forward-facing toes of the bird B are located in the capture channels 62 of the set of capture channels 60 at a position on the opposite side of the guide opening 45. In other words, the forward-facing toes of the bird B move over and past the guide opening 45 such that the claws at the distal ends of the forward-facing toes are located past the guide opening 45 (and such that the guide opening 45 is located between the claws and the converging portions of the set of capture channels 60) during movement of the toe guide to the capture position as described herein.

With the forward-facing toes of the bird B in the capture channels 62 such that the claws at the distal ends of the forward-facing toes are located past the guide opening 45 when the toe guide 40 is in the capture position, the toe guide 40 is moved along the guide axis 41 in a finish direction that is opposite the capture direction. As a result, the forward-facing toes of the bird B (and the claws located at the distal ends of those forward-facing toes) are moved into the guide opening 45 and directed into the set of guide channels extending from the guide opening and through the capture plate 42.

Figure 20:
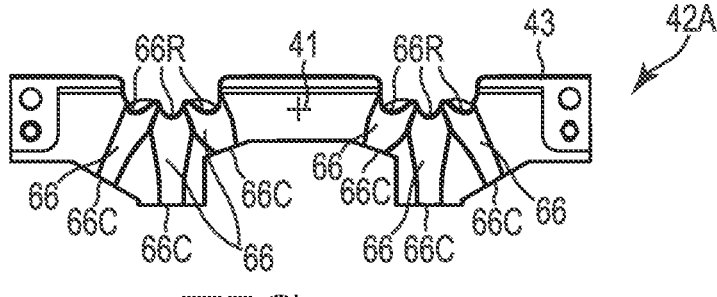
FIG. 20 is an end view of the surface of the capture portion of the capture plate of the toe guide plate that faces the alignment portion of the capture plate of the toe guide of FIGS. 18 and 19.
Figure 21:
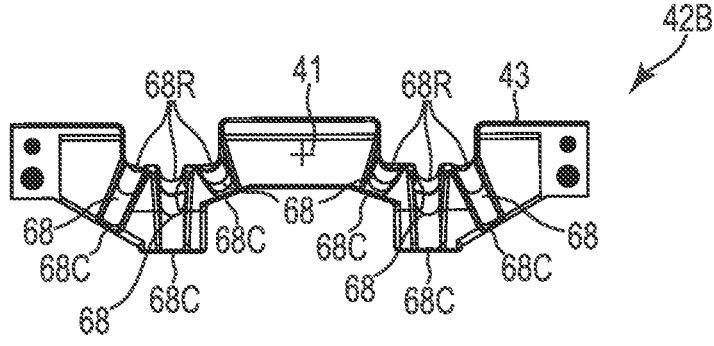
FIG. 21 is an end view of the surface of the alignment portion of the capture plate of the toe guide plate that faces the capture portion of the capture plate of the toe guide of FIGS. 18 and 19.

To provide the guide channels in the depicted illustrative embodiment, the capture plate 42 is provided in two parts with a capture part 42A containing the converging portions of capture channels 62 and the alignment part 42B containing the generally parallel portions of the capture channels 62. The surface of the capture part 42A facing the alignment part 42B of capture plate 42 is depicted in FIG. 20, while the surface of the alignment part 42B of the capture plate 42 facing capture part 42A is depicted in FIG. 21. The guide channels formed through the capture plate 42 are defined by guide channel depressions formed in each of these facing surfaces. In particular, guide channel depressions 66 in capture part 42A, along with guide channel depressions 68 in alignment part 42B, form a set of guide channels when capture part 42A and alignment part 42B are assembled together as seen in, e.g., FIGS. 18-19.

Each of the guide channel depressions 66 and 68 can be described as having both a receiving aperture and a claw aperture. With respect to the guide channel depressions 66 in capture part 42A, each of the guide channel depressions 66 includes a receiving aperture 66R and a claw aperture 66C, with the guide channel depressions 66 extending between the receiving aperture 66R and the claw aperture 66C. With respect to the guide channel depressions 68 in alignment part 42B, each of the guide channel depressions 68 includes a receiving aperture 68R and a claw aperture 68C, with the guide channel depressions 68 extending between the receiving aperture 68R and the claw aperture 68C. When assembled together, the guide channel depressions 66 and 68 in capture part 42A and alignment part 42B of capture plate 42 define guide channels having receiving apertures at one end and claw apertures at the opposite end.

Another feature of the depicted illustrative embodiment of capture plate 42 is that the guide channels associated with the guide opening 45 of each set of capture channels 60 diverge when moving from the receiving apertures to the claw apertures of the guide channels within each set of guide channels. The diverging arrangement of the guide channels can be seen in the diverging guide channel depressions 66 in capture part 42A and corresponding diverging guide channel depressions 68 in alignment part 42B. In particular, each set of guide channel depressions 66 in capture part 42A diverges when moving from their receiving apertures 66R to their claw apertures 66C, while each set of guide channel depressions 68 in alignment part 42B diverges when moving from their receiving apertures 68R to their claw apertures 68C.

While the converging sets of capture channels 60 are useful for separating and aligning the forward-facing toes and claws on each shank of a bird, the diverging sets of guide channels leading from each of the guide openings 45 in each set of capture channels 60 are useful for properly positioning the toes and claws apart from each other where they may be inspected, processed, etc. without interference from the adjacent toes and claws on each shank of the bird.

The toe guides and poultry toe and claw positioning systems described herein may be particularly adapted to deliver energy to the claws of a bird whose toes and claws are positioned using the systems described herein. With reference to, e.g., FIGS. 22-24, the illustrative embodiment of toe guide 40 includes a set of applicators 70 that may be used to establish radio frequency (RF) electric fields that can be used for either or both the detection of poultry claws and selective delivery of RF energy to claws on the forward-facing toes of birds. Illustrative systems and methods in which RF energy is used in connection with the claws of birds is described in, e.g., International Publication No. WO 2019/236964 titled ENERGY DELIVERY SYSTEM USING AN ELECTRIC FIELD (Gorans et al.) (claiming priority to U.S. Provisional Patent Application No. 62/682,262 filed on 8 Jun. 2018).

Figure 22:
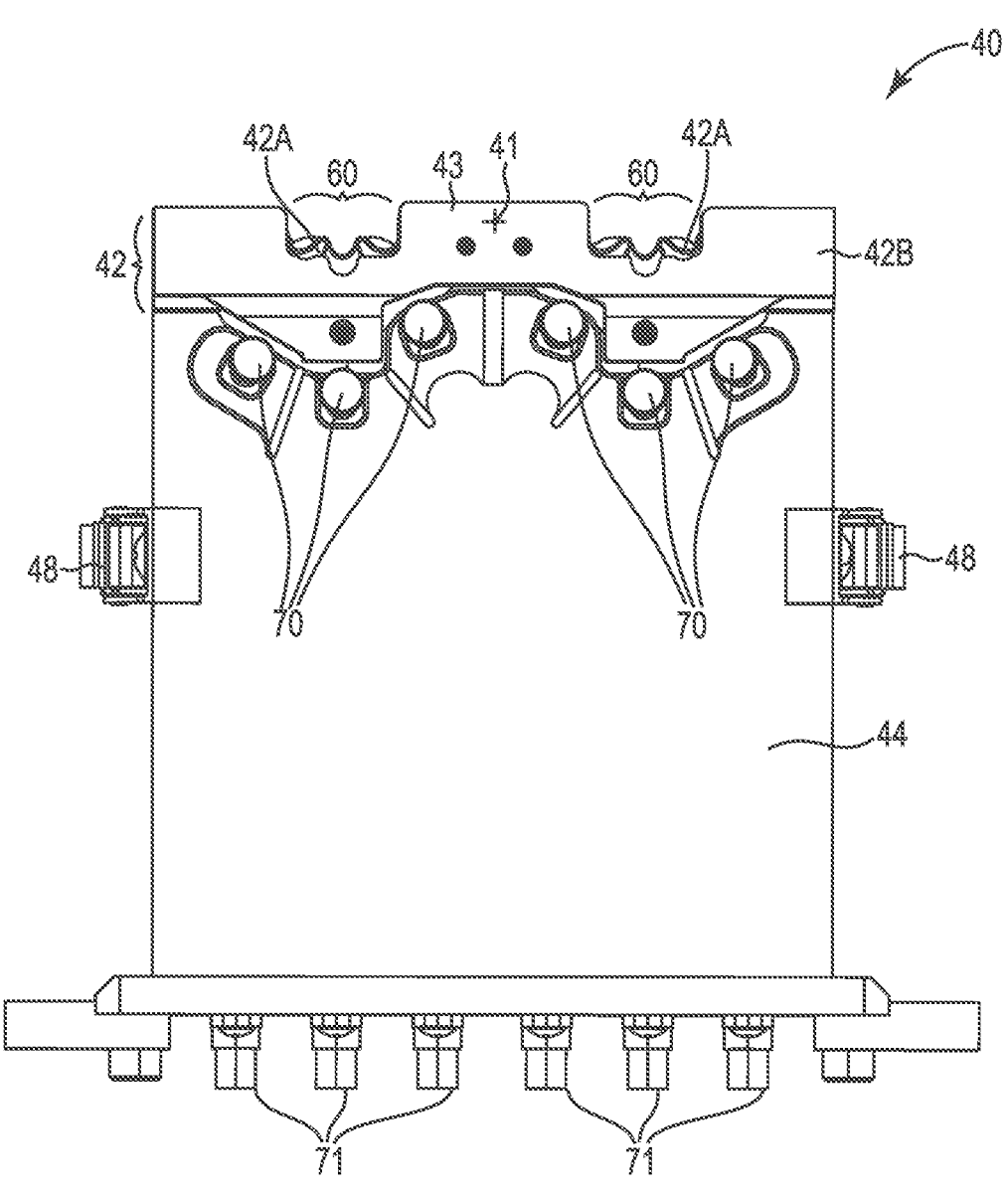
FIG. 22 is a back side view of the toe guide of FIGS. 18 and 19.
Figure 23:
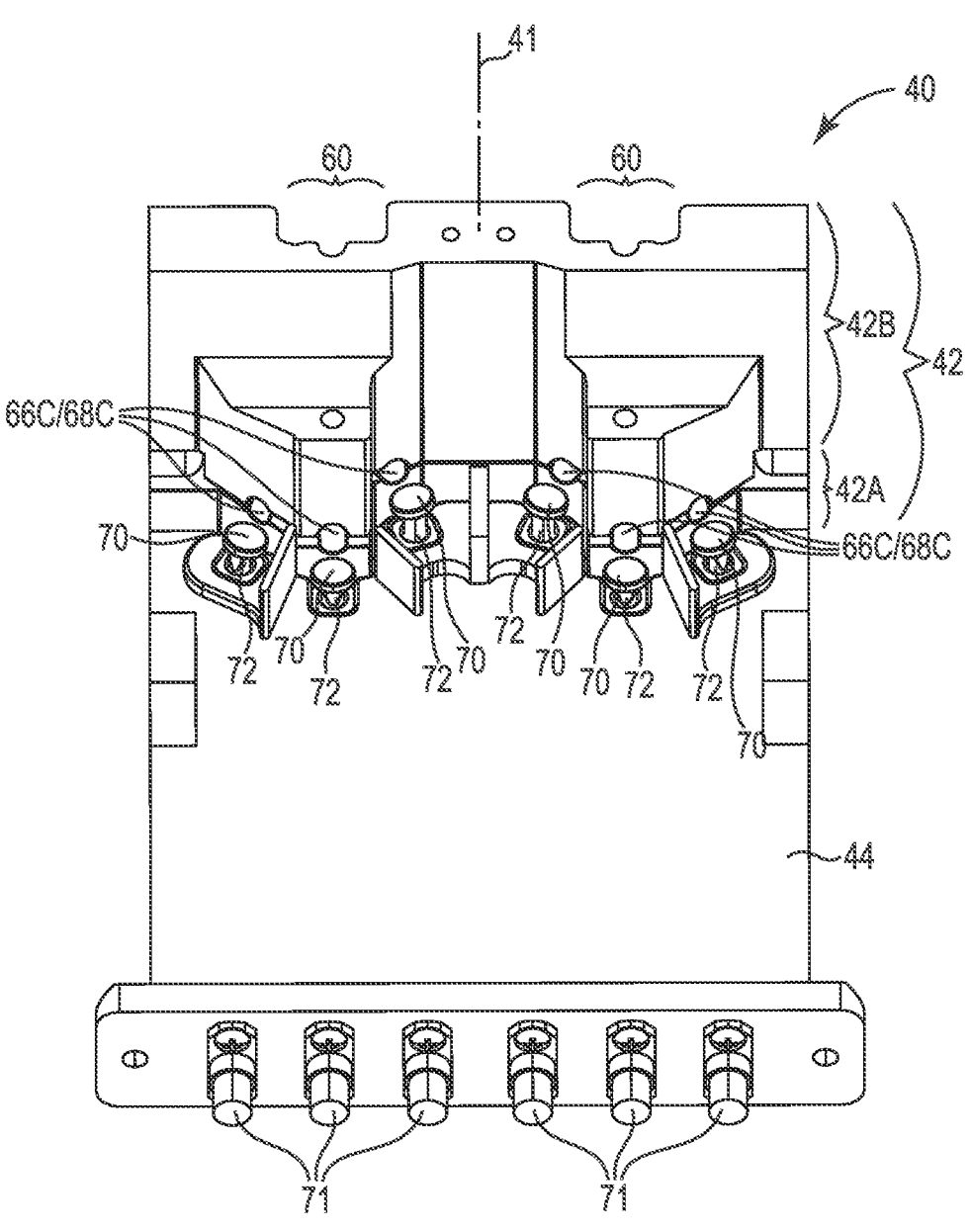
FIG. 23 is a bottom-back side perspective view of the toe guide of FIGS. 18, 19, and 22.
Figure 24:
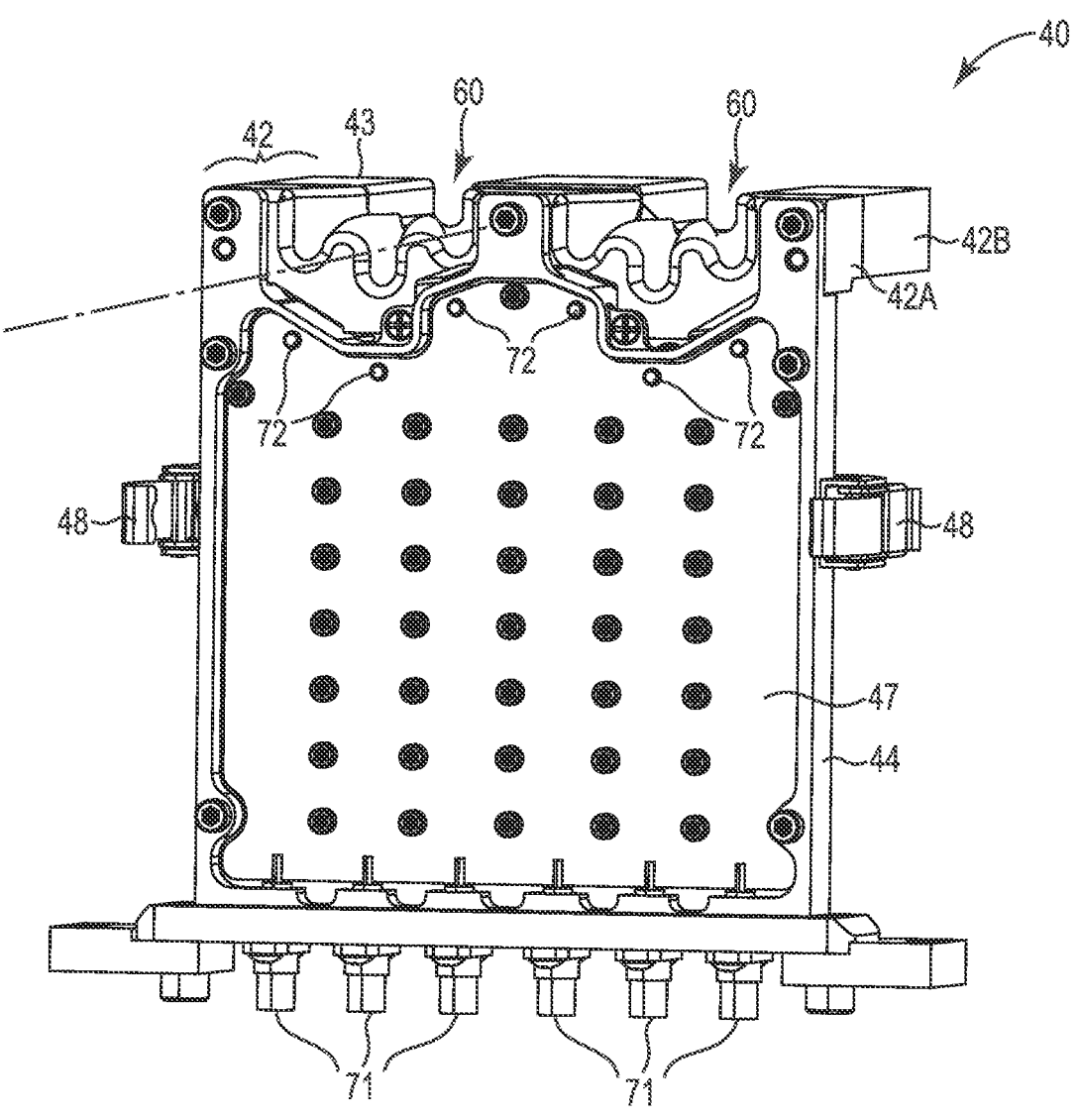
FIG. 24 is a front side perspective view of the toe guide of FIGS. 18, 19, 22 and 23.

As depicted in FIGS. 22-24, one applicator 70 is positioned proximate the claw apertures 66C/68C of each of the guide channels formed through the capture plate 42 of toe guide 40 as described herein. In the depicted embodiment, the applicators 70 are attached to the base 44 of toe guide 40 below the capture plate 42. Each of the applicators includes a post 72 extending through the base 44 of the toe guide 40. The posts 72 electrically connect the applicators 70 to a tuning board 47 that may be used in the delivery of RF energy to the applicators 70. The RF energy delivered to applicators 70 may be delivered to the tuning board 47 through connectors 71 on base 44 of the toe guide 40. Illustrative embodiments of tuning boards used in RF energy delivery and their use may be described in, for example, International Publication No. WO 2019/236964 titled ENERGY DELIVERY SYSTEM USING AN ELECTRIC FIELD (Gorans et al.).

Figure 25:
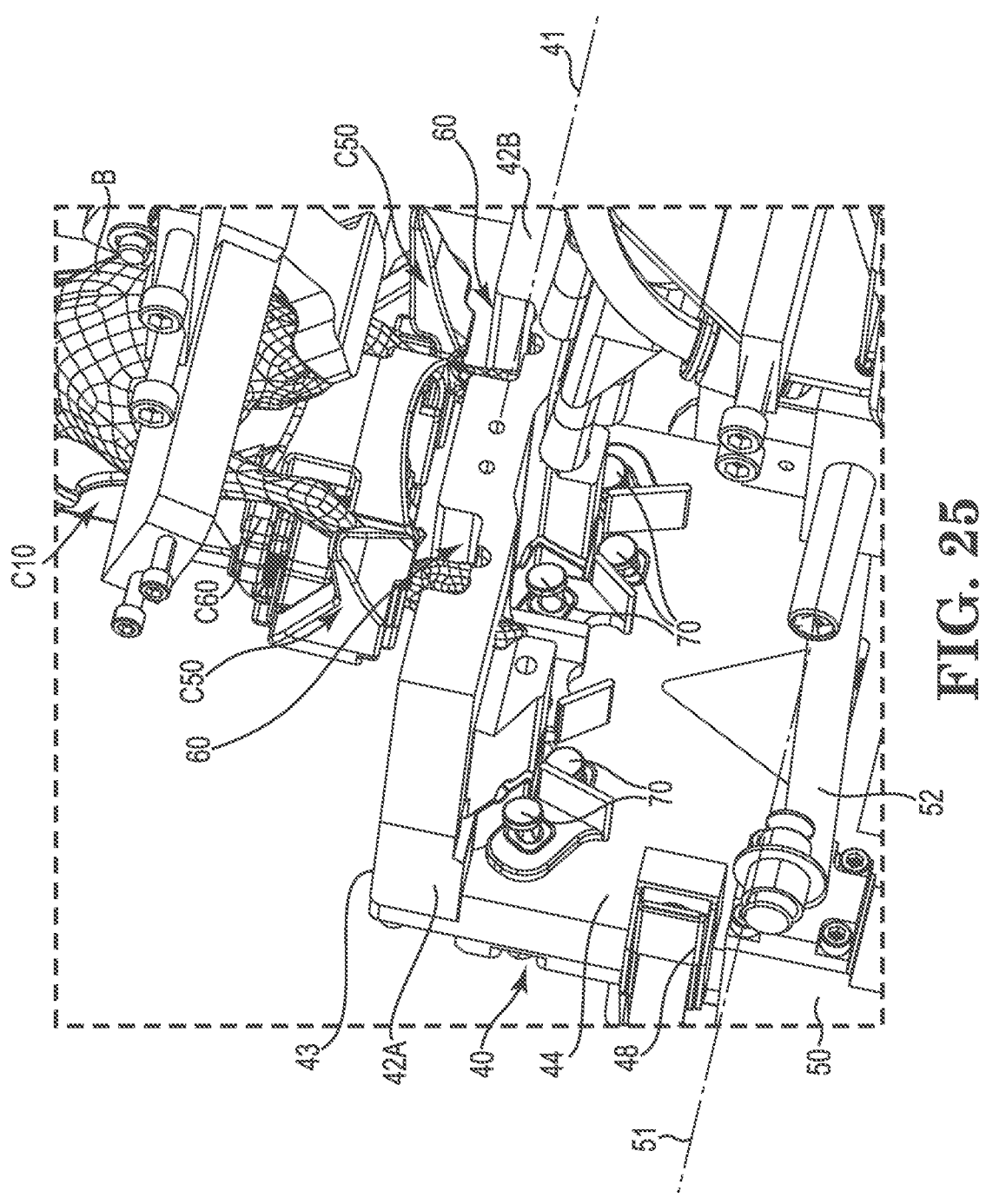
FIG. 25 is a back side perspective view of the toe guide of FIGS. 18, 19, 22 and 23 in the poultry toe and claw positioning system of FIG. 8 with a bird restrained in a poultry cradle as described herein.
Figure 26:
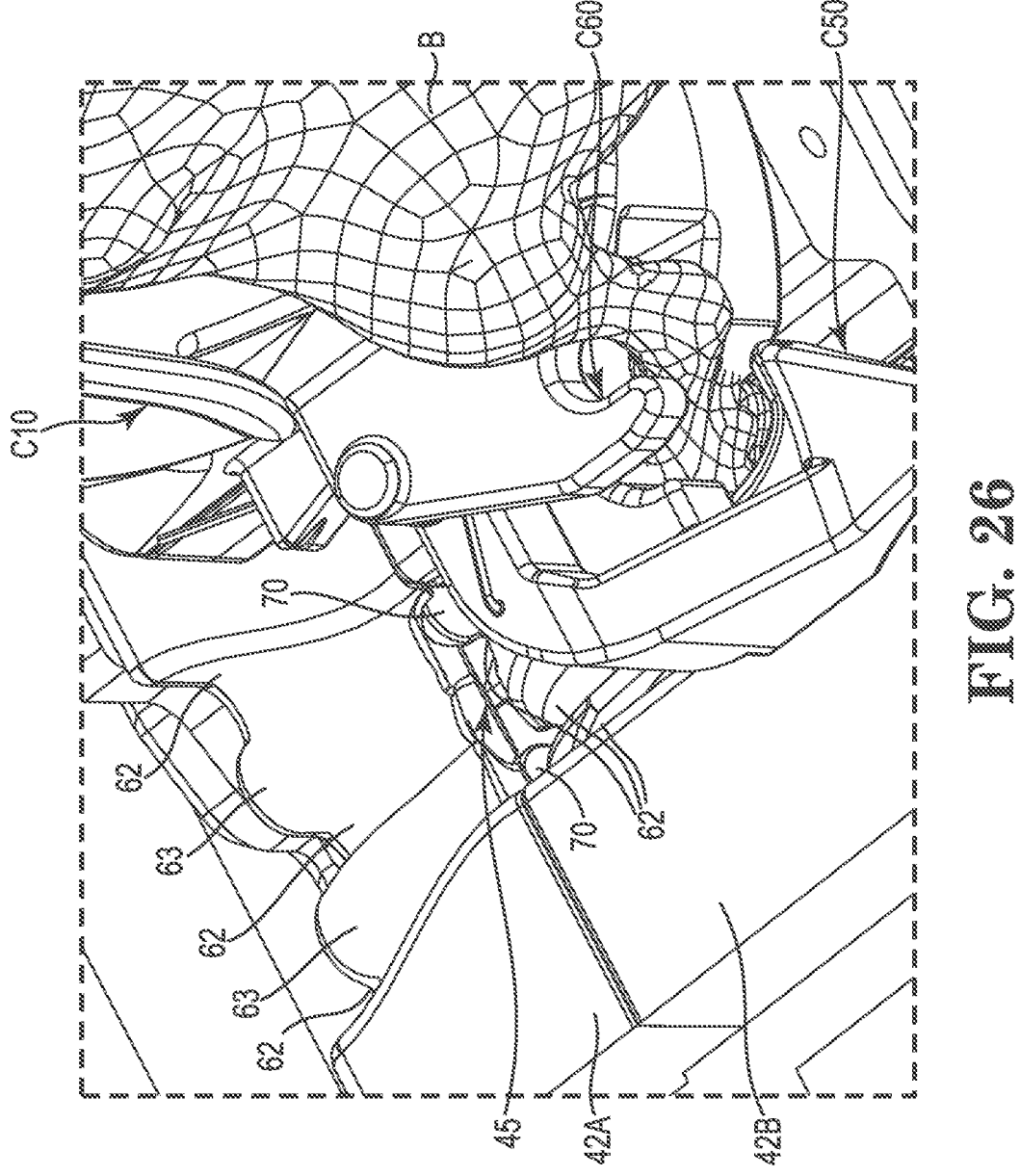
FIG. 26 is a top side perspective view of the toe guide of FIG. 25.

FIGS. 25-26 provide alternate views of the applicators 70 on the base 44 of the illustrative embodiment of toe guide 40 in combination with a bird B restrained in a poultry cradle C10 as described herein. In particular, some of the applicators 70 can be seen through the guide opening 45 located along capture channels 62 between capture part 42A and alignment part 42B of capture plate 42 before the forward-facing toes of the bird B are directed into the guide channels of guide opening 45 as described herein.

Another optional feature depicted in FIG. 26 can be useful in the processing of poultry having webbing extending between the forward-facing toes of the birds (such as, e.g., ducks, geese, etc.). As seeing in FIG. 26, the guide opening 45 extends through the capture plate 42 between adjacent pairs of the guide channels 66 of the set of guide channels such that the guide opening 45 and the set of guide channels are configured to receive webbing extending between adjacent pairs of forward-facing toes in the adjacent pairs of guide channels 66.

Figure 27:
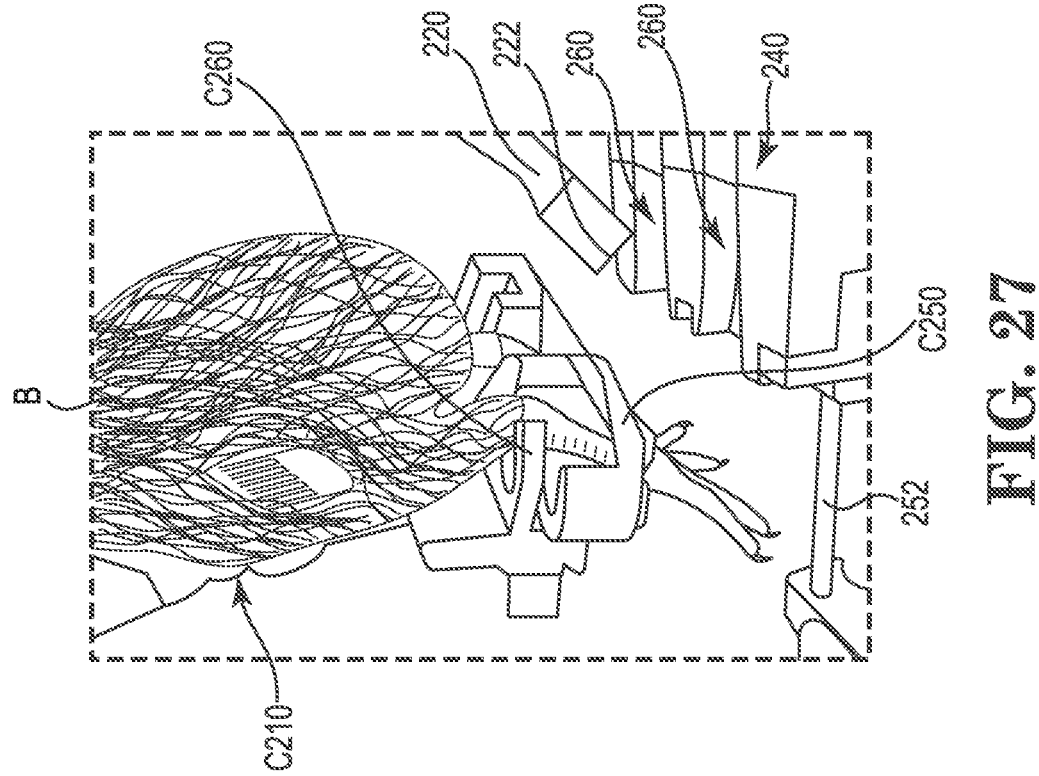
FIG. 27 depicts a portion of another illustrative embodiment of a poultry toe and claw positioning system as described herein with a bird restrained in a poultry cradle in a selected position relative to the system and before movement of a seat lift to act on the bird restrained in the poultry cradle.

FIGS. 27-33 depict another illustrative embodiment of a poultry toe and claw positioning system as described herein in use. In particular, FIG. 27 depicts a bird B restrained in a poultry cradle C210 in a selected position relative to the system. The left shank of the bird B is located in the shank clamp C250 and the shank guide C260. Also depicted in FIG. 27 is a rail 252 of the toe guide track/rail assembly on which the depicted toe guide 240 moves. Toe guide 240 also includes two sets of capture channels 260 formed therein. Another illustrative embodiment of a seat lift 220 (including lift end 222) is depicted in its ready position before movement of the seat lift 220 to act on the bird B restrained in the poultry cradle C210.

Figure 28:
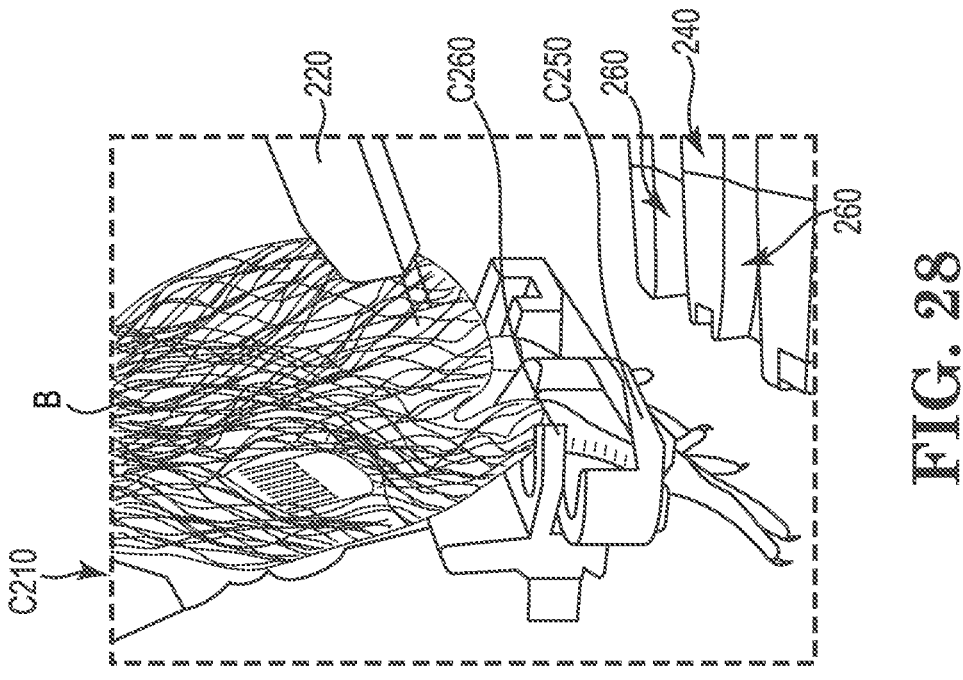
FIG. 28 depicts the poultry toe and claw positioning system of FIG. 27 after movement of the seat lift to act on the bird restrained in the poultry cradle.

FIG. 28 depicts the poultry toe and claw positioning system of FIG. 27 after movement of the seat lift 220 from its ready position to its lift position in which the seat lift 220 acts on the bird B restrained in the poultry cradle C210. As described herein, movement of the seat lift 220 from its ready position to its lift position as depicted in FIG. 28 causes the shanks of the bird B to move upward such that the forward-facing toes of the bird B and the distal/inferior ends of the shanks of the bird B are moved to a location just below the inferior/distal/bottom sides of the shank clamps C250 of poultry cradle C210. As a result, the forward-facing toes of the bird B are positioned in a known location relative to the remainder of the poultry toe and claw positioning system.

Figures 29, 30:
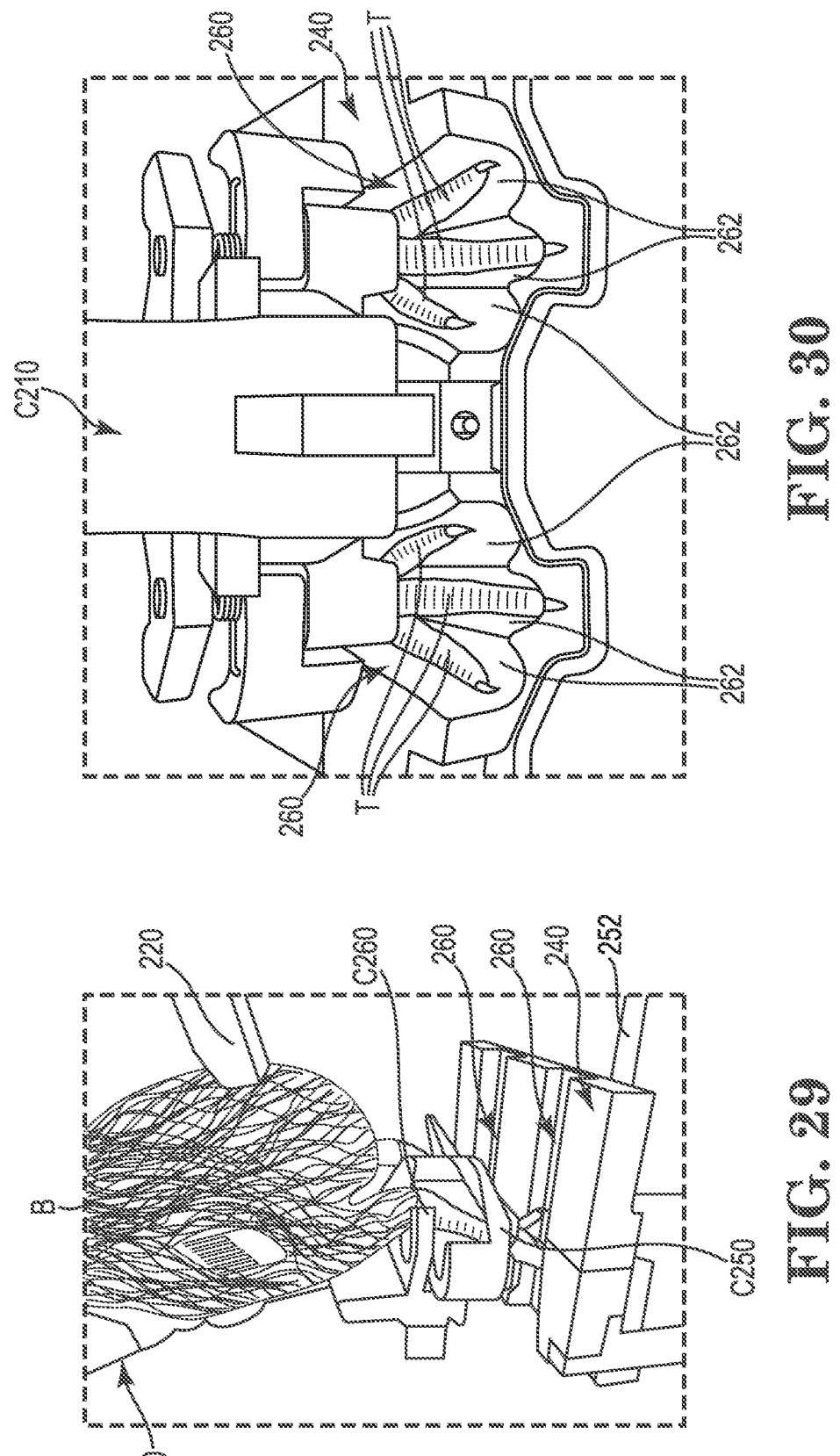
FIG. 29 depicts the poultry toe and claw positioning system of FIG. 28 after movement of the toe guide track/rail assembly upward from its base position to its operating position which also moves the toe guide into contact with the forward-facing toes of the bird in the poultry cradle.
FIG. 30 depicts the forward-facing toes on both the left and right shanks of the bird and cradle depicted in FIG. 29 in each set of capture channels on the toe guide.

FIG. 29 depicts the poultry toe and claw positioning system of FIG. 28 after movement of the toe guide track/rail assembly (as represented by rail 252 in FIG. 29) upward from its base position to its operating position as described herein and after toe guide 240 has been moved from its home position towards (but not yet at) the capture position as described herein. The toe guide 240 is, as seen in FIG. 29, positioned such that the converging portions of the sets of capture channels 260 are positioned beneath the forward-facing toes T of the bird B. Toe guide 240 is supported by the toe guide track/rail assembly and, as a result, toe guide 240 is moved into contact with the forward-facing toes of the bird B in poultry cradle C210.

FIG. 30 depicts the forward-facing toes on both the left and right shanks of the bird B in the poultry cradle C210 depicted in FIG. 29 in each set of capture channels 260 on the toe guide 240. In particular, the forward-facing toes T on the left and right shanks of the bird restrained in the poultry cradle C210 are located in capture channels 262 of each set of capture channels 260. Movement of the toe guide track/rail assembly upward into its operating position in which toe guide 240 contacts the forward-facing toes of a bird may be controlled by sensing the pressure exerted on the toe guide 240 by the forward-facing toes T while in one or more other embodiments, the operating position of the toe guide track/rail assembly and toe guide 240 carried thereon may be fixed relative to the poultry cradle C210 (with no consideration for the force exerted on the toe guide 240 by the forward-facing toes).

Figures 31, 32:
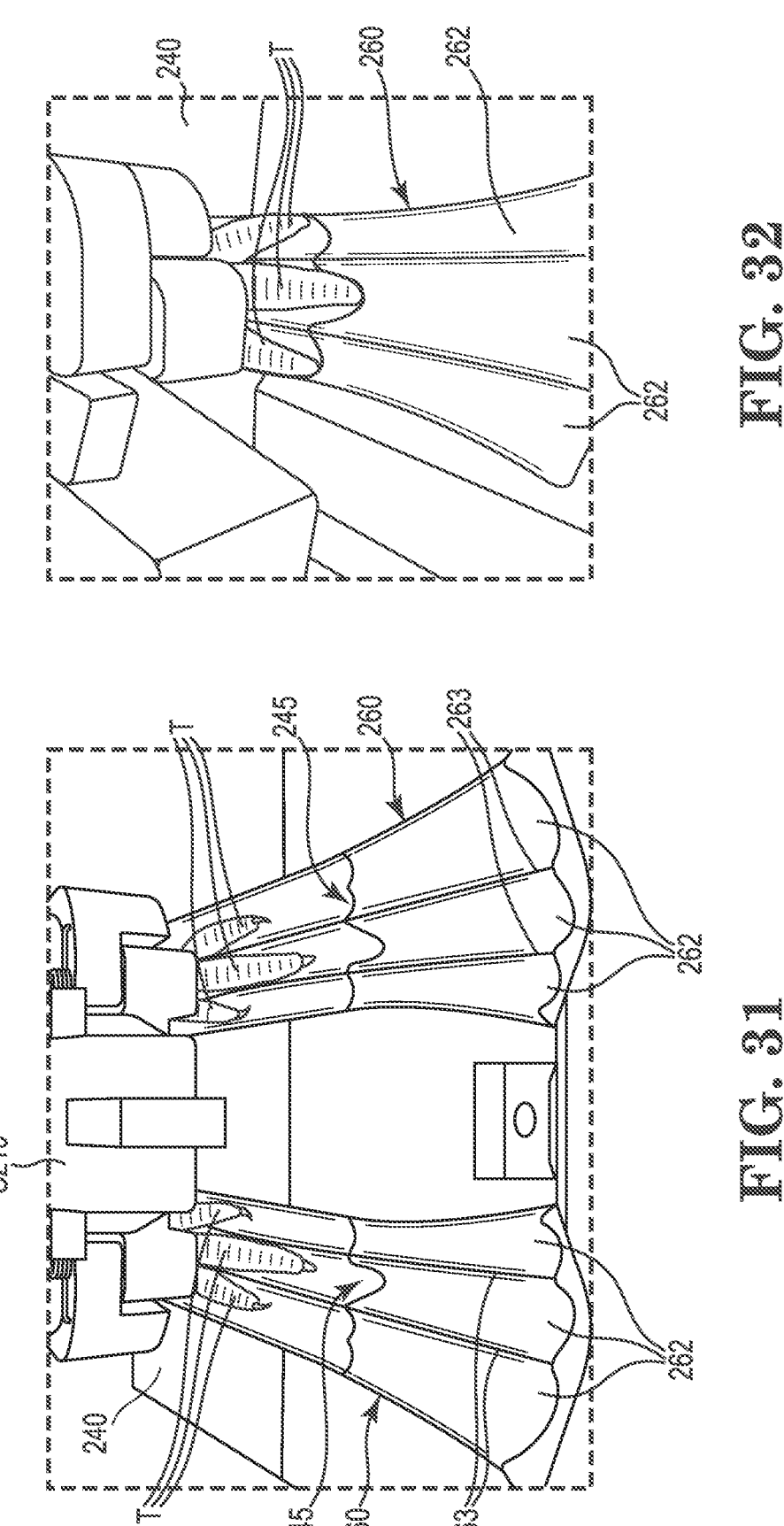
FIG. 31 depicts the forward-facing toes on both the left and right shanks of the bird and cradle depicted in FIG. 30 after movement of the toe guide along the guide axis to a capture position.
FIG. 32 depicts the forward-facing toes on the left shank of the bird and cradle depicted in FIG. 31 after movement of the toe guide along the guide axis from the capture position of FIG. 31 to a finish position in which the forward-facing toes (and associated claws) have entered the guide openings in each set of capture channels.

FIG. 31 depicts the forward-facing toes T on both the left and right shanks of the bird B in the cradle C210 depicted in FIG. 30 after movement of the toe guide 240 along the guide axis to a capture position in which the forward-facing toes T have been moved past guide openings 245 that separate the converging portions of capture channels 262 from the aligned portions of the capture channels 262 as described herein. Also depicted in FIG. 31 are ridges 263 separating adjacent pairs of channels 262. Ridges 263 may facilitate proper positioning of the forward-facing toes T in individual capture channels 262.

FIG. 32 depicts the forward-facing toes T on the left shank of the bird B depicted in FIG. 31 after movement of the toe guide 240 from the capture position of FIG. 31 to a finish position in which the forward-facing toes T (and associated claws) have entered the guide openings 245 in each set of capture channels 260.

Figure 33:
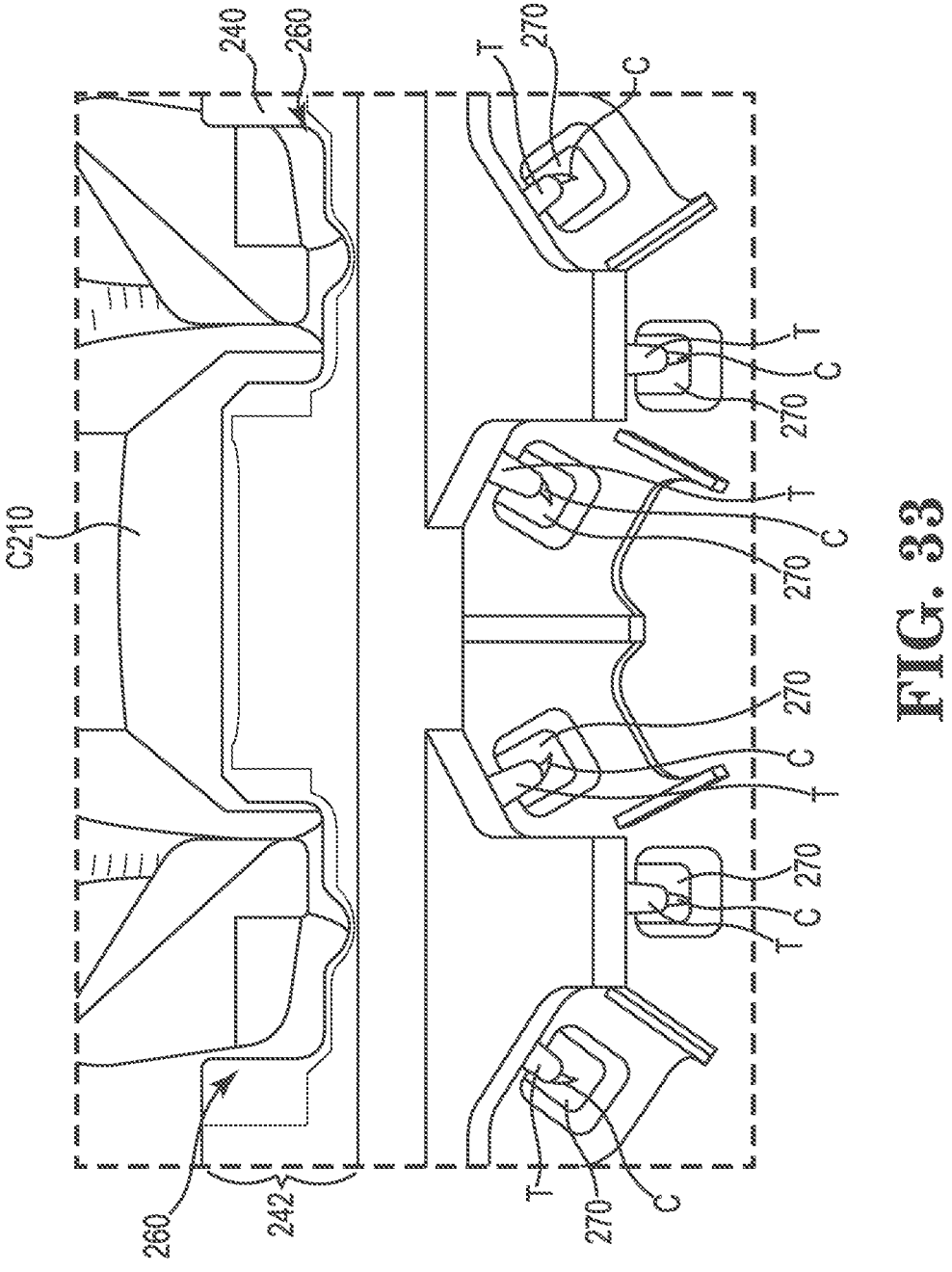
FIG. 33 is a back side view of the toe guide of FIG. 32 depicting the forward-facing toes on both the left and right shanks extend through and out of the guide channels after passing through the guide openings in the sets of capture channels such that the distal ends of the toes and the claws located thereon are positioned proximate the detectors of the toe guide.

FIG. 33 is a back side view of the toe guide 240 of FIG. 32 depicting the forward-facing toes T on both the left and right shanks of the bird B extending through and out of the guide channels extending from the guide openings 245 and formed through the capture plate 242 of the toe guide 240 (see, e.g., the guide channels formed in the capture plate 42 as described herein). As seen in FIG. 33, the forward-facing toes T pass through the guide openings 245 in the sets of capture channels 260 such that the distal ends of the toes and the claws located thereon are positioned proximate the detectors 270 of the toe guide 240.

In particular the claws C extending from the distal end of each of the toes T are also positioned proximate the detectors 270 when the toe guide 240 is in its finish position as described herein. The precise position of the distal ends of the forward-facing toes T and associated claws C relative to the detectors 270 may be adjusted so that, as a group, the distal ends of the forward-facing toes T and associated claws C are in a desired position relative to the detectors 270. That precise positioning may be achieved by, in one or more embodiments, moving the toe guide 240 along the toe guide axis and/or moving the toe guide track/rail assembly between its base position and its operating position to achieve desired positions for the forward-facing toes T and associated claws C relative to detectors 270 as a group.

In one or more embodiments of the poultry toe and claw positioning systems described herein, the detectors 270 may be used to deliver RF energy that can be used to detect the positions of the forward-facing toes T and associated claws C as described in, for example, International Publication No. WO 2019/236964 titled ENERGY DELIVERY SYSTEM USING AN ELECTRIC FIELD (Gorans et al.).

Figure 34:
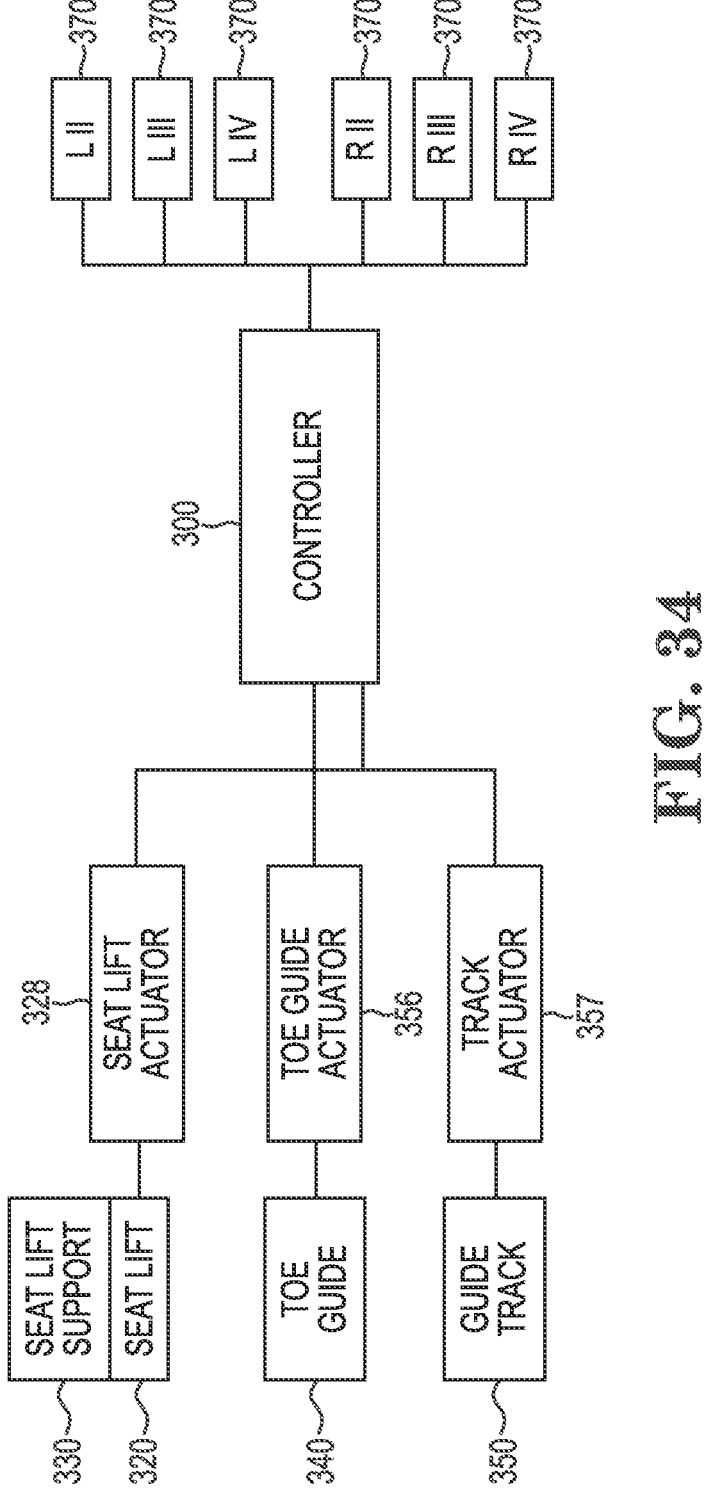
FIG. 34 is a schematic diagram of components in one illustrative embodiment of a poultry toe and claw positioning system as described herein.

FIG. 34 is a schematic diagram of components in one illustrative embodiment of a poultry toe and claw positioning system as described herein. The depicted system includes a controller 300 operably connected to a seat lift actuator 328, a toe guide actuator 356, and a track actuator 357.

The seat lift actuator 328 is operably connected to a seat lift 320 (and, where present, a seat lift support 330) of the poultry toe and claw positioning systems described herein. As described herein, the seat lift actuator 328 is used to move the seat lift 320 between its ready and lift positions. In those systems including a seat lift support 330, the seat lift actuator 328 may also move the seat lift support 330 between its retracted and forward positions.

The toe guide actuator 356 is operably connected to a toe guide 340 of the poultry toe and claw positioning systems described herein. As described herein, the toe guide actuator 356 is used to move the toe guide between its home, capture, and finish positions along a guide axis.

The track actuator 357 is operably connected to a toe guide track 350 along which the toe guide 340 of the poultry toe and claw positioning systems described herein moves. As described herein, the track actuator 357 is used to move the toe guide track 350 between its base and operating positions to assist in proper capture and positioning of the forward-facing toes and claws of a bird.

The controller 300 may be provided in any suitable form and may, for example, include memory and a controller. The controller may, for example, be in the form of one or more microprocessors, Field-Programmable Gate Arrays (FPGA), Digital Signal Processors (DSP), microcontrollers, Application Specific Integrated Circuit (ASIC) state machines, etc. The controllers may include one or more of any suitable input devices configured to allow a user to operate the poultry toe and claw systems described herein (e.g., keyboards, touchscreens, mice, trackballs, etc.), as well as display devices configured to convey information to a user (e.g., monitors (which may or may not be touchscreens), indicator lights, etc.). Although not depicted separately, the controller 200 may incorporate a pneumatic and/or hydraulic control system in those systems in which one or more of the actuators use pneumatic and/or hydraulic components.

The illustrative embodiment of the poultry toe and claw positioning system depicted in FIG. 34 also includes a series of detectors 270 designated for the various forward-facing toes of birds processed in the depicted system. In particular, the applicators may be designated for the forward-facing distal phalanges II, III, and IV on the left and right shanks of a bird with the forward-facing distal phalange II on the left shank being designated "L II," the forward-facing distal phalange III on the left shank being designated "L III," and the forward-facing distal phalange IV on the left shank being designated "L IV" (with the forward-facing distal phalanges on the right shank being, respectively, designated "R II," "R III," and "R IV").

The controller 300 may include optionally integrated controllers capable of operating the detectors 370 as needed to detect the claws of birds as described herein. As a result, controller 300 may include components capable of detecting claws as described herein using RF energy, optical energy, vision systems, capacitive systems, etc. In those embodiments in which RF energy is used, reference may be had to International Publication No. WO 2019/236964 titled ENERGY DELIVERY SYSTEM USING AN ELECTRIC FIELD (Gorans et al.) for a discussion of the components, circuitry, techniques, etc. used in the detection and, optionally, processing of poultry claws as described therein.

Figure 35:
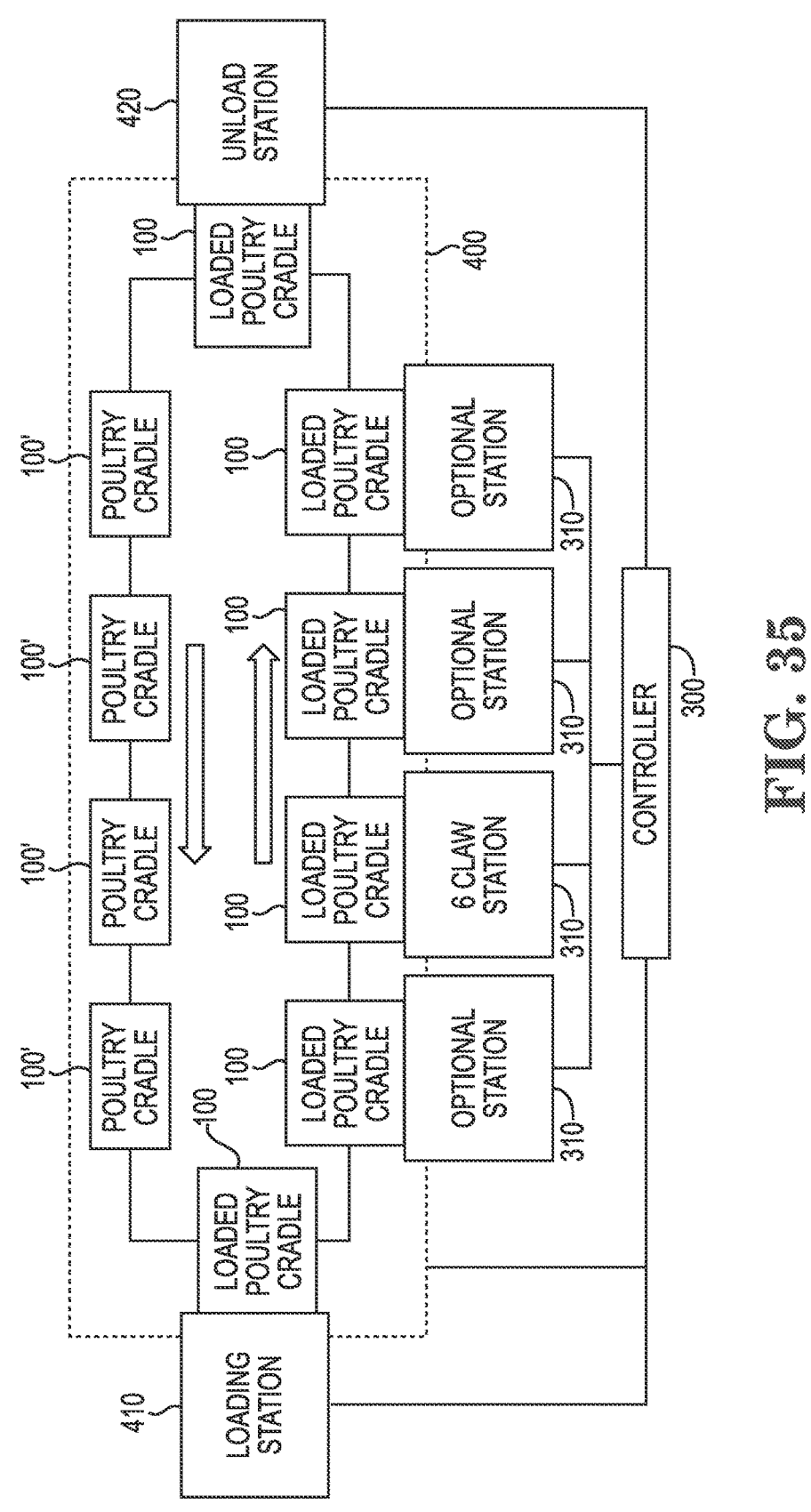
FIG. 35 is a schematic diagram of one illustrative embodiment of a system as described herein that includes multiple poultry cradles, a loading station, and unloading station, and one illustrative embodiment of a poultry toe and claw positioning system along with locations for one or more additional stations.

FIG. 35 is a schematic diagram of one illustrative embodiment of a system as described herein that includes multiple poultry cradles, a loading station, and unloading station, and one illustrative embodiment of a poultry toe and claw positioning system along with locations for one or more additional processing stations. Some illustrative examples of such systems may be described in, e.g., U.S. Pat. No. 7,066,112, titled AUTOMATED POULTRY PROCESSING METHOD AND SYSTEM.

The illustrative embodiment of the processing system depicted in FIG. 35 includes a controller 300 operably connected to stations 310 at which various processes can be performed on a bird located in a poultry cradle at the selected station 310. The system includes a series of poultry cradles 100 and 100' and a conveying system 400 configured to move the poultry cradles 100 and 100' between the stations 310 as well as between a loading station 410 and an unload station 420. Birds are loaded into each poultry cradle 100' at the loading station 410 where they are conveyed to the stations 310 using conveying system 400 where selected processes can be performed on the birds located in the loaded poultry cradles 100. In particular, the station designated "6 CLAW STATION" may be one embodiment of a poultry toe and claw positioning system as described herein.

After processing at one or more of the stations 310, the loaded poultry cradles 100 are conveyed using conveying system 400 to the unload station 420 where a bird restrained in the loaded poultry cradle 100 is released, with the unloaded poultry cradle 100' moving away from the unload station for reloading at the loading station 410.

Although only poultry toe and claw positioning systems are described herein, stations 310 may include beak treatment/inspection stations, injection stations, nutrient delivery stations, stations for treating the rear-facing phalange I (located proximal on the shank proximal/above/superior the distal phalanges II, III, and IV), gender identification stations, etc.

Nonlimiting examples of processes and/or processing stations that may be used in one or more embodiments of the systems described herein may be described in, for example, U.S. Pat. No. 5,195,925 (METHOD AND APPARATUS FOR DECLAWING POULTRY); U.S. Pat. No. 5,651,731 (METHOD AND APPARATUS FOR DEBEAKING POULTRY); U.S. Pat. No. 7,232,450 (APPARATUS AND METHOD FOR UPPER AND LOWER BEAK TREATMENT); U.S. Pat. No. 8,499,721 (APPARATUS AND METHOD FOR NASAL DELIVERY OF COMPOSITIONS TO BIRDS); U.S. Pat. No. 7,363,881 (BEAK TREATMENT WITH TONGUE PROTECTION); U.S. Pat. No. 9,775,695 (FOURTH TOE PROCESSING SYSTEMS AND METHODS); US Patent Application Publication US 2019/0133734 (POULTRY INJECTION APPARATUS WITH ROTATING CAPTURE MEMBERS AND METHODS OF USE); International Publication WO 2018204572 (INJECTION SYSTEMS AND METHODS); International Publication WO 2019236964 (ENERGY DELIVERY SYSTEM USING AN ELECTRIC FIELD); US Patent Application Publication 2021/0068937 (MATERIAL DELIVERY SYSTEMS, BEAK OPENING APPARATUS AND METHODS OF USE); etc.

In one or more embodiments, poultry cradles that may be used in connection with the systems described herein may be described in U.S. Provisional Application titled POULTRY CRADLES AND METHODS OF RESTRAINING POULTRY filed on even date herewith in the name of Applicant Nova-Tech Engineering, LLC 63/273,430. In one or more embodiments, one or more of the processing stations may be in the form of a rear-facing poultry claw detection and/or processing system as described in described in the U.S. Provisional Application titled REAR-FACING POULTRY CLAW SYSTEM AND METHOD filed on even date herewith in the name of Applicant Nova-Tech Engineering, LLC 63/273,423. In one or more embodiments, one or more of the processing stations may be in the form of a poultry beak processing and/or masking system as described in described in the U.S. Provisional Application titled POULTRY BEAK PROCESSING SYSTEM AND METHOD filed on even date herewith in the name of Applicant Nova-Tech Engineering, LLC 63/273,438.

All references and publications cited herein are expressly incorporated herein by reference in their entirety into this disclosure, except to the extent they may directly contradict this disclosure. Although specific illustrative embodiments have been described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims.

What is claimed is:

1. A poultry toe and claw positioning system comprising:
a seat lift operably attached to a system frame, the seat lift configured to move between a ready position and a lift position, along a lift axis;
a toe guide operably attached to the system frame, the toe guide comprising:
   a capture plate comprising a leading edge facing away from the seat lift,
   a set of capture channels formed in a support surface of the capture plate, wherein each capture channel of the set of capture channels is configured to receive a forward-facing toe of a bird and the set of capture channels is configured to receive the forward-facing toes on one shank of a bird, wherein each capture channel of the set of capture channels comprises an open end proximate the leading edge of the capture plate, and wherein the set of capture channels converge when moving away from the open ends of the capture channels along the support surface, and
   a guide opening in the set of capture channels, wherein the set of capture channels converge at the guide opening;

a set of guide channels extending from the guide opening through the capture plate, wherein each guide channel of the set of guide channels extends through the support plate from a receiving aperture in the guide opening to a claw aperture located distal from the receiving aperture, wherein the set of guide channels diverge when moving from the receiving apertures of the guide channels to the claw apertures of the guide channels;

a toe guide actuator operably connected to the toe guide, the toe guide actuator configured to move the toe guide along a guide axis between a home position, a capture position, and a finish position, wherein the home position is closer to the lift axis than the capture position, and wherein the finish position is located between the capture position and the home position;

a seat lift actuator operably connected to the seat lift, the seat lift actuator configured to rotate the seat lift about the lift axis to move the seat lift between the ready position and the lift position; and a controller operably connected to the toe guide actuator and the seat lift actuator, wherein the controller is configured to:

operate the seat lift actuator such that the seat lift actuator moves the seat lift from the ready position to the lift position, operate the toe guide actuator such that the toe guide actuator moves the toe guide along the guide axis from the home position to the capture position after operating the seat lift actuator to rotate the seat lift from the ready position to the lift position, and operate the toe guide actuator such that the toe guide actuator moves the toe guide along the guide axis from the capture position to the finish position after moving the toe guide along the guide axis from the home position to the capture position.

2. A system according to claim 1, wherein the system further comprises a seat lift support, wherein the seat lift is located on the seat lift support, wherein the seat lift support is configured to move the seat lift from a retracted position to a forward position, and wherein the seat lift from the ready position to the lift position as the seat lift support moves from the retracted position to the forward position.

3. A system according to claim 2, wherein the seat lift actuator is operably connected to the seat lift support, the seat lift actuator configured to move the seat lift support between the retracted position and the forward position while the seat lift actuator rotates the seat lift about the lift axis from the ready position to the lift position.

4. A system according to claim 2, wherein movement of the seat lift support between the retracted position and the forward position moves the lift axis.

5. A system according to claim 1, wherein the capture channels of the set of capture channels are oriented generally parallel/aligned with each other when moving along the guide axis away from the guide opening.

6. A system according to claim 1, wherein the seat lift support is configured to rotate about a support axis when moving between the retracted position and the forward position.

7. A system according to claim 1, wherein the guide opening extends through the capture plate between adjacent pairs of the guide channels of the set of guide channels such that the guide opening and the set of guide channels are configured to receive webbing extending between adjacent pairs of forward-facing toes in the adjacent pairs of guide channels.

8. A system according to claim 1, wherein the system comprises a poultry cradle located in a selected position relative to the system frame, wherein the poultry cradle is configured to restrain a bird such that the seat lift acts on a seat of the bird when the poultry cradle is in the selected position and the seat lift is in the lift position.

9. A poultry toe and claw positioning system comprising:

a seat lift operably attached to a system frame, the seat lift configured to move between a ready position and a lift position, along a lift axis;

a toe guide operably attached to the system frame, the toe guide comprising:

a capture plate comprising a leading edge facing away from the seat lift, a set of capture channels formed in a support surface of the capture plate, wherein each capture channel of the set of capture channels is configured to receive a forward-facing toe of a bird and the set of capture channels is configured to receive the forward-facing toes on one shank of a bird, wherein each capture channel of the set of capture channels comprises an open end proximate the leading edge of the capture plate, and wherein the set of capture channels converge when moving away from the open ends of the capture channels along the support surface, and a guide opening in the set of capture channels, wherein the set of capture channels converge at the guide opening;

a set of guide channels extending from the guide opening through the capture plate, wherein each guide channel of the set of guide channels extends through the capture plate from a receiving aperture in the guide opening to a claw aperture located distal from the receiving aperture, wherein the set of guide channels diverge when moving from the receiving apertures of the guide channels to the claw apertures of the guide channels;

a toe guide track operably attached to the system frame, the toe guide track defining a guide axis, wherein the toe guide is mounted on the toe guide track and configured to move along the guide axis between a home position, a capture position, and a finish position, wherein the home position is closer to the lift axis than the capture position, and wherein the finish position is located between the capture position and the home position, and further wherein the toe guide track is configured to move from a base position to an operating position;

a toe guide actuator operably connected to the toe guide, the toe guide actuator configured to move the toe guide along the guide axis between the home position, the capture position, and the finish position;

a seat lift actuator operably connected to the seat lift, the seat lift actuator configured to rotate the seat lift about the lift axis to move the seat lift between the ready position and the lift position;

a track actuator operably connected to the toe guide track to move the toe guide track between the base position and the operating position; and a controller operably connected to the toe guide actuator, the seat lift actuator, and the track actuator, wherein the controller is configured to:

operate the seat lift actuator such that the seat lift actuator moves the seat lift from the ready position to the lift position, operate the toe guide actuator such that the toe guide actuator moves the toe guide along the guide axis from the home position to the capture position after operating the seat lift actuator to rotate the seat lift from the ready position to the lift position, and operate the toe guide actuator such that the toe guide actuator moves the toe guide along the guide axis from the capture position to the finish position after moving the toe guide along the guide axis from the home position to the capture position, and operate the track actuator such that the track actuator moves the toe guide track from the base position to the operating position after operating the toe guide actuator to move the toe guide along the guide axis away from the home position and before the toe guide reaches the capture position.

10. A system according to claim 9, wherein the system further comprises a seat lift support, wherein the seat lift is located on the seat lift support, wherein the seat lift support is configured to move the seat lift from a retracted position to a forward position, and wherein the seat lift from the ready position to the lift position as the seat lift support moves from the retracted position to the forward position.

11. A system according to claim 10, wherein the seat lift actuator is operably connected to the seat lift support, the seat lift actuator configured to move the seat lift support between the retracted position and the forward position while the seat lift actuator rotates the seat lift about the lift axis from the ready position to the lift position.

12. A system according to claim 11, wherein the seat lift support is configured to rotate about a support axis when moving between the retracted position and the forward position.

13. A system according to claim 10, wherein movement of the seat lift support between the retracted position and the forward position moves the lift axis.

14. A system according to claim 9, wherein the capture channels of the set of capture channels are oriented generally parallel/aligned with each other when moving along the guide axis away from the guide opening.

15. A system according to claim 9, wherein the guide opening extends through the capture plate between adjacent pairs of the guide channels of the set of guide channels such that the guide opening and the set of guide channels are configured to receive webbing extending between adjacent pairs of forward-facing toes in the adjacent pairs of guide channels.

16. A system according to claim 9, wherein the toe guide track rotates about a track axis when moving between the base position and the operating position, and wherein the track axis is offset from and transverse to the lift axis.

17. A system according to claim 9, wherein the system comprises a poultry cradle located in a selected position relative to the system frame, wherein the poultry cradle is configured to restrain a bird such that the seat lift acts on a seat of the bird when the poultry cradle is in the selected position and the seat lift is in the lift position.

* * * * *